United States Patent [19]
Shiono et al.

[11] Patent Number: 5,796,850
[45] Date of Patent: Aug. 18, 1998

[54] NOISE REDUCTION CIRCUIT, NOISE REDUCTION APPARATUS, AND NOISE REDUCTION METHOD

[75] Inventors: Takashi Shiono; Mutsumi Yoshinaga, both of Tokyo, Japan

[73] Assignee: Mitsubishi Denki Kabushiki Kaisha, Tokyo, Japan

[21] Appl. No.: 752,527

[22] Filed: Nov. 20, 1996

[30] Foreign Application Priority Data

Apr. 26, 1996 [JP] Japan ..................... 8-106997

[51] Int. Cl.$^6$ ................................... H04B 15/00
[52] U.S. Cl. ..................... 381/94.1; 381/94.8; 330/149; 330/151
[58] Field of Search ..................... 381/94, 13, 56, 381/57, 104, 107, 108, 110, 71.1, 71.2, 71.8, 71.13, 71.14; 386/114; 455/63, 222–3, 278.1, 283, 296–7, 317; 330/149, 151

[56] References Cited

U.S. PATENT DOCUMENTS

| | | | |
|---|---|---|---|
| 3,611,145 | 10/1971 | O'Connor | 381/94.2 |
| 3,768,028 | 10/1973 | Wolcott et al. | 330/149 |
| 3,821,482 | 6/1974 | Hirsch | 381/94.1 |
| 3,940,709 | 2/1976 | Heaslett | 330/151 |
| 4,216,430 | 8/1980 | Amazawa et al. | 381/94.8 |
| 4,759,071 | 7/1988 | Heide | 381/94.5 |
| 5,148,117 | 9/1992 | Talwar | 330/151 |
| 5,554,958 | 9/1996 | Donoghue | 330/149 |
| 5,617,061 | 4/1997 | Fukucki | 330/151 |
| 5,625,322 | 4/1997 | Gourgue et al. | 330/149 |
| 5,642,076 | 6/1997 | Noakawa et al. | 330/149 |
| 5,703,529 | 12/1997 | Ghaffaripour et al. | 381/94.5 |

FOREIGN PATENT DOCUMENTS

| | | |
|---|---|---|
| 59-115629 | 7/1984 | Japan . |
| 3-169199 | 7/1991 | Japan . |

*Primary Examiner*—Curtis Kuntz
*Assistant Examiner*—Xu Mei
*Attorney, Agent, or Firm*—Rothwell, Figg, Ernst & Kurz

[57] ABSTRACT

A mixed signal which contains a noise is inputted. Then, the signal is inverted and amplified by an inverting amplifier which has a high gain, and attenuated by a attenuator in order to generate an inverted phase signal. In a mixer, the inputted signal and the inverted phase signal are added, and outputted. Since the inverted phase component of the noise is added to the noise, the noise in the mixed signal is canceled. For the voice signal, an amplified inverted signal is generated by an invert amplifier. However, an amplitude is restricted due to a high gain. Since the amplitude is restricted, a level of the inverted phase signal is lower than a level of a voice signal. Even if the voice signal and the inverted phase component are added in the mixer, the voice signal is outputted almost thoroughly.

5 Claims, 25 Drawing Sheets

5,796,850

1

NOISE REDUCTION CIRCUIT, NOISE REDUCTION APPARATUS, AND NOISE REDUCTION METHOD

BACKGROUND OF THE INVENTION

1. Field of the Invention

This invention relates to a circuit in which, when a noise is inputted, an inverted phase signal of the noise is added to cancel the noise, and when a mixed signal of a voice and a noise is inputted, the mixed signal is outputted completely without canceling the noise.

2. Description of the Related Art

Related Art 1.

A noise reduction circuit according to the related art is configured as illustrated in the block chart of FIG. 21.

In FIG. 21, an amplifier 1, a voice signal/noise distinction circuit 2 and a variable attenuator 3 are illustrated between an input terminal (left circle) and an output terminal (right circle).

The noise reduction circuit according to the related art operates as stated in the following.

According to the related art, a mixed signal of a voice signal and noise is amplified by the amplifier 1, and passed through the voice signal/noise distinction circuit 2. The variable attenuator 3 is controlled according to the output of the voice signal/noise distinction circuit 2. When it is determined that a voice signal is not included in the mixed signal, that is, it is determined that the signal only includes the noise, the gain is lowered to reduce the unpleasant noise which would otherwise reach the communication apparatus at the other end.

The mechanism of the related art is explained more in detail with reference to a noise-controlled communication apparatus disclosed in Japanese Unexamined Patent Application Hei 6-88954 (filed on Apr. 26, 1994, corresponding U.S. patent application Ser. No. 08/405,019 filed on Mar. 16, 1995).

The noise-controlled communication apparatus according to the related art is configured as illustrated in the block chart of FIG. 22.

FIG. 22 illustrates a voice control IC (Integrated Circuit) 31 in a standard communication apparatus, an input terminal 32 of a receiving signal from another communication apparatus, a receiving amplifier 33, and a receiver terminal 34 to a receiver speaker, etc. In addition, a high-pass filter 35, a DC (Direct Current) Converter 36, simplified controllers 37 and 38, an input terminal 41 from a microphone, a transmitting amplifier 42, a high-pass filer 43, and a low-pass filter 44 are illustrated. In this communication apparatus, a control voltage controller 300 provides a volume control voltage to each of variable attenuators 31b and 31c.

The noise-controlled communication apparatus according to the related art operates as stated in the following.

A receiving signal is inputted at the input terminal 32, and transmitted to the voice control IC 31 through pin 2. Then, the signal is attenuated by the variable attenuator 31c in the voice control IC 31. The attenuated signal is transmitted to the receiving amplifier 33 through pin 3, and outputted to a receiver from the receiver terminal 34. The receiving signal is filtered by the high-pass filter 35 so that the low band component of the ambient noise from the side of the communication apparatus at the other end is attenuated. Then, the signal is converted to DC by the DC converter 36, and inputted to the voice control IC 31 at pins 8 and 10 via the simplified controllers 37 and 38. The simplified control-

2 lers 37 and 38 are connected to a reference voltage at pin 4 in the voice control IC 31, and output a control voltage to each of pins 8 and 10 of the voice control IC 31.

In the simplified controller 37, a reference voltage is used to generate a control signal to control the voice control IC 31 properly. The control signal is inputted to a control mode switching circuit 31a at a control terminal (pin 8) which is on a side of the variable attenuator 31c.

In the simplified controller 38, a reference voltage is also used, and an inverted phase control signal is generated. The inverted phase control signal is inputted to the control mode switching circuit 31a at a control terminal (pin 10) on a side of the variable attenuator 31b.

The control mode switching circuit 31a in the voice control IC 31 is able to stop attenuation of the variable attenuator 31c. In this case, the receiving signal which is inputted at pin 2 is outputted from pin 3 without attenuation. The outputted signal is amplified by the receiving amplifier 33, and transmitted to the receiver from the receiver terminal 34.

A signal from a microphone for transmission is inputted from the input terminal 41 to the transmitting amplifier 42. The signal is filtered by the high-pass filter 43 and the low-pass filter 44, and inputted to the voice control IC 31 at pin 14. In a normal state, the signal is not attenuated by the variable attenuator 31b, and is outputted at pin 13. Then, the signal is transmitted as a transmission signal to the communication apparatus at the other end through a terminal 45.

In a normal state, the transmitting signal is not attenuated, and the receiving signal is attenuated. When the receiving signal is detected, the receiving signal is not attenuated, and the transmitting signal is attenuated.

The communication apparatus which is illustrated in FIG. 22 is modified and improved as illustrated in FIG. 23.

In FIG. 23, a transistor 22, an input resistance 23, a load resistance 24, a voltage maintainer 25, a high-pass filter 26 and 27 and a comparator 47 are added to the elements of FIG. 22. Other elements in FIG. 23 correspond to the elements with identical numbering in FIG. 22.

The communication apparatus which is illustrated in FIG. 23 operates as stated in the following.

When a transmitting signal is inputted from a microphone for transmission to the communication apparatus, a voice component is extracted by the transmitting amplifier 42 and the high-pass filter 43. The high-pass filter 43 is a high-pass tertiary filter with a cutoff frequency of 700 Hz, for example. Generally, a noise has a HOTH spectrum characteristic, and an ambient noise component is attenuated by the high-pass filter 43. The voice component which is extracted by the high-pass filter 43 is also filtered by the high-pass filters 26 and 27, and inputted to the base of the transistor 22 through the input register 23.

The relationship between the transistor 22 and the transmitting signal is illustrated in FIG. 24.

In FIG. 23, the base voltage of the transistor 22 is set at a predefined threshold value. In FIG. 24, the threshold value is 0.6 V. When the voice component which is extracted by the high-pass filters 43, 26 and 27 exceeds the threshold value of 0.6 V, the transistor lowers the electric potential of the voltage maintainer 25.

The voltage maintainer 25 maintains a constant electric potential in a normal state. The electric potential gives a constant voltage to pins 8 and 10 of the voice control IC 31. This condition is called as an idle mode condition.

In a normal state, owing to the constant voltage, the voice control IC 31 maintains an interim condition between a transmitting mode and a receiving mode.

The voltage maintainer 25 controls the control mode switching circuit 31a, and provides transmitting, receiving and idle modes. The receiving mode is defined as level "1", the transmitting mode is defined as level "0" and the idle mode which is a condition without transmission and receipt is defined as level "0.5." Each of the variable attenuators 31b and 31c is controlled according to the mode.

In case of the idle mode, a receiving signal is inputted at pin 2, and attenuated to almost half by the variable attenuator 31c. Then, the attenuated signal is outputted to the receiving amplifier 33 from pin 3.

In the idle mode, the transmitting signal is inputted to the variable attenuator 31b from pin 14, and attenuated to almost to half of its original value. The attenuated signal is outputted from pin 13, and transmitted as a transmitting signal from the terminal 45.

For example, when the transistor 22 has a threshold value of 0.6 V and a transmitting level exceeds 0.6 V, the transistor 22 detects a transmitting signal and begins to operate. When the transistor 22 operates, the electric potential of the voltage maintainer 25 drops, and pin 10 of the voice control IC 31 is raised to a high electric potential. Then, the control mode switching circuit 31a operates to stop attenuation of the variable attenuator 31b. Consequently, the transmitting signal is outputted from the terminal 45 without attenuation.

Only when there is a voice signal from the microphone, the voice control IC 31 is brought into the transmitting mode, and the variable attenuator 31b stops attenuation. When there is no voice from the microphone, the variable attenuator 31b performs full attenuation and reduces an ambient noise.

When there is a receiving signal, the receiving signal is filtered by the high-pass filter 35 and the DC convertor 36, and raises the electric potential of the voltage maintainer 25. At this time, the output from the comparator 47 becomes at GND (ground) level. Therefore, even when a voice from a speaker is captured by the microphone, the transistor 22 is not turned on, and an electric potential at pin 8 of the voice control IC 31 becomes higher. When the control mode switching circuit 31a operates, the variable attenuator 31c stops attenuation. Thus, the receiving signal is transmitted to the receiving amplifier 33 without attenuation, and a clear receiving signal is obtained.

When FIG. 21 and FIG. 23 are compared, the input terminal 41 in FIG. 23 corresponds to the input terminal (left circle) in FIG. 21. The output terminal 45 in FIG. 23 corresponds to the output terminal (right circle) in FIG. 21. The transmitting amplifier 42 in FIG. 23 corresponds to the amplifier 1 in FIG. 21. A circuit 900 enclosed with a broken line which includes a circuit from the high-pass filter 43 to the transistor 22, the voltage maintainer 25, the control mode switching circuit 31a, a control voltage controller 300, etc. in FIG. 23 corresponds to the voice signal/noise distinction circuit 2 in FIG. 21. The variable attenuator 31b in FIG. 23 corresponds to the variable attenuator 3 in FIG. 21.

As stated in explanation on FIG. 21, the variable attenuator 31b is controlled, and when there is no transmitting signal, the gain of the variable attenuator 31b is lowered to reduce unpleasant noise which would otherwise reach the communication apparatus at the other end.

For example, when an electronic volume control IC (M51132L made by Mitsubishi Denki Kabushiki Kaisha) is used as the voice control IC 31, operation is performed as stated in the following.

FIG. 25 shows the attenuation amount versus volume control voltage characteristic of the variable attenuators 31b and 31c in the electronic volume IC (M51132L made by Mitsubishi Denki Kabushiki Kaisha).

The volume control voltage is a voltage which the control voltage controller 300 provides to the variable attenuators 31b and 31. As shown in FIG. 25, when the volume control voltage becomes 4.5 V or more, the attenuation amount of the variable attenuator 31b of the electronic volume IC becomes 0 dB. As illustrated in FIG. 23, in the electronic volume control IC, the volume control voltage is finally given by the control voltage controller 300 to control the gain of the variable attenuator 31b.

For example, since there is a time constant for the control voltage controller 300, when the volume control voltage is raised from around 0 V to 4.5 V, tens of msec are necessary. Therefore, the beginning part of the communication is missed due to the delay in control of the variable attenuator 31b.

Related Art 2.

A part of specifications and drawings in Japanese Unexamined Published Patent Application Sho 59-115629, which discloses an output amplifier for a positive reduction protecting circuit is described in the following.

FIG. 26 is a part of a block chart of the output amplifier according to the related art.

An input signal is inputted to a preamplifier 102 from an input terminal 111. The signal is amplified by the preamplifier 102, and transmitted to an input side of an adder amplifier 105 via two channels, i.e., via a line 103 and via an inverting low-pass filter 104. A noise signal in a low band is selected by the inverting low-pass filter 104, and the signal is inverted. Therefore, a signal level which is reached via the line 103 is decreased by the level of the signal in the low band which passes through the inverting low-pass filter 104. According to the related art, a ripple Chebyshev filter of 3 dB is used as the inverting low-pass filter. A signal is outputted from the adder amplifier 105, and inputted to an output amplifier 106 according to the related art. Then, the signal is outputted from an output terminal 107.

According to the noise-controlled communication apparatus in related art 1 which is illustrated in FIG. 23, when there is no voice signal to be transmitted, the gain of the transmitting signal is lowered to reduce unpleasant noise. However, when a mixed signal of a voice signal and noise is transmitted, the gain of the transmitting signal is not lowered. Therefore, when an unpleasant background noise exists when transmitting voice signals, the unpleasant background noise is also transmitted.

Further, when the control voltage controller has a delay in controlling the attenuation amount of the variable attenuator, the beginning part of the output voice signal is missed.

Further, when the electric volume control IC is used, the cost is high.

In addition, in the output amplifier for the positive reduction protecting circuit in related art 2, noise and voice are distinguished by the low-pass filter. Therefore, when a frequency component of the noise and a frequency component of the voice are close together, the low-pass filter does not function effectively.

SUMMARY OF THE INVENTION

Accordingly, it is an object of this invention to address the above-stated problems in the related art.

This invention aims at providing a noise reduction circuit and a noise reduction method which are able to cancel background noise during communication.

This invention also aims at providing a noise reduction circuit and a noise reduction method which do not cause missing of the beginning part of the voice signal due to a delay in the control of the variable attenuator.

This invention also aims at providing a noise reduction circuit which does not require an expensive electronic volume control IC.

This invention also aims at providing a noise reduction circuit and a noise reduction method which are able to cancel noise without distinguishing the noise from the voice signal.

A noise reduction circuit according to this invention comprises an inverting amplifier for receiving an input signal containing noise, and for outputting an inverted amplified signal which is restricted in amplitude, an attenuator for attenuating the inverted amplified signal outputted from the inverting amplifier to develop an attenuated signal, and a mixer for adding the input signal and the attenuated signal to develop an output signal at an output terminal.

The noise reduction circuit further comprises an auto level controller connected between an output and an input of said inverting amplifier which maintains a constant amplitude of the output signal from the inverting amplifier.

The noise reduction circuit further comprises the auto level controller which contains an AC/DC converter with a half-wave amplifier.

The noise reduction circuit further comprises an over-input distortion prevention circuit which attenuates said input signal and prevents distortion due to an over-input.

A noise reduction apparatus according to this invention includes a first noise reduction circuit and a second noise reduction circuit, which comprises a low-pass filter for receiving an input signal and outputting a signal in a band with a low frequency to said first noise reduction circuit, said first noise reduction circuit receiving said low frequency signal and outputting a first noise-reduced signal, said second noise reduction circuit also receiving said input signal, and outputting a second noise-reduced signal, and a band mixer, for mixing together said first and second noise-reduced signals as to develop a mixed output signal and outputting said mixed output signal at an output terminal.

The noise reduction apparatus further comprises a high-pass filter for receiving said input signal and passing a signal in a band with a high frequency as an input signal to said second noise reduction circuit.

The noise reduction apparatus further comprises a plurality of band-pass filters, into which an input signal is inputted respectively, and from which signals in bands of a certain frequency range are outputted respectively, a plurality of noise reduction circuits for, receiving respective signals which have been outputted by the band-pass filters, and for reducing noise in said respective signals, and for outputted reduced-noise signal, and a band mixer, in which reduced-noise signals which have been outputted by the plurality of noise reduction circuits are mixed to develop a mixed signal, and outputting said mixed signal at an output terminal.

The noise reduction apparatus further comprises a mixer for mixing the signal which has passed through the noise reduction circuits and one of the input signal and a signal which has passed through the filter.

A noise reduction method according to this invention comprises an inverting amplifying step, in which an input signal is inputted, inverted and amplified, and an inverted amplified signal with a restricted amplitude is generated, an attenuation step, in which the signal which is inverted and amplified in the inverting amplifying step is attenuated, and a signal adding step, in which the input signal and a signal which is attenuated in the attenuation step are added, and outputted.

The noise reduction method further comprises an auto level control step to maintain a constant amplitude of the inverted amplified signal which is outputted in the inverting amplifying step.

The noise reduction method comprises a low band filtering step, in which an input signal is inputted, and a signal in a band with a low frequency is passed, a first noise reduction step, in which noise in the signal passed by the low band filtering step is reduced and a first noise-reduced signal is outputted as a result, a second noise reduction step, in which noise in said input signal is reduced and a second noise-reduced signal is outputted as a result, and a band mixing step in which the first and second noise-reduced signals are mixed and outputted.

The noise reduction method further comprises a high band filtering step, in which an input signal is inputted, a signal in a band with a high frequency is passed, and the signal after the high band filtering step is provided as an input signal to the second noise reduction step.

The noise reduction method comprises a plurality of band filtering steps, in which an input signal is inputted, and a plurality of signals each of a band with a different certain frequency is passed, a noise reduction step, in which the signals passed by the plurality of band filtering steps are inputted, and noise is reduced to develop a plurality of noise-reduced signals, and a band mixing step, in which said plurality of noise-reduced signals are mixed and outputted.

According to this noise reduction method, the signal after the noise reduction step and one of the input signal and the signal after one of filtering step are mixed, and outputted.

Other objects features, and advantages of the invention will be apparent from the following description when taken in conjunction with the accompany drawings.

7

Figure 15:
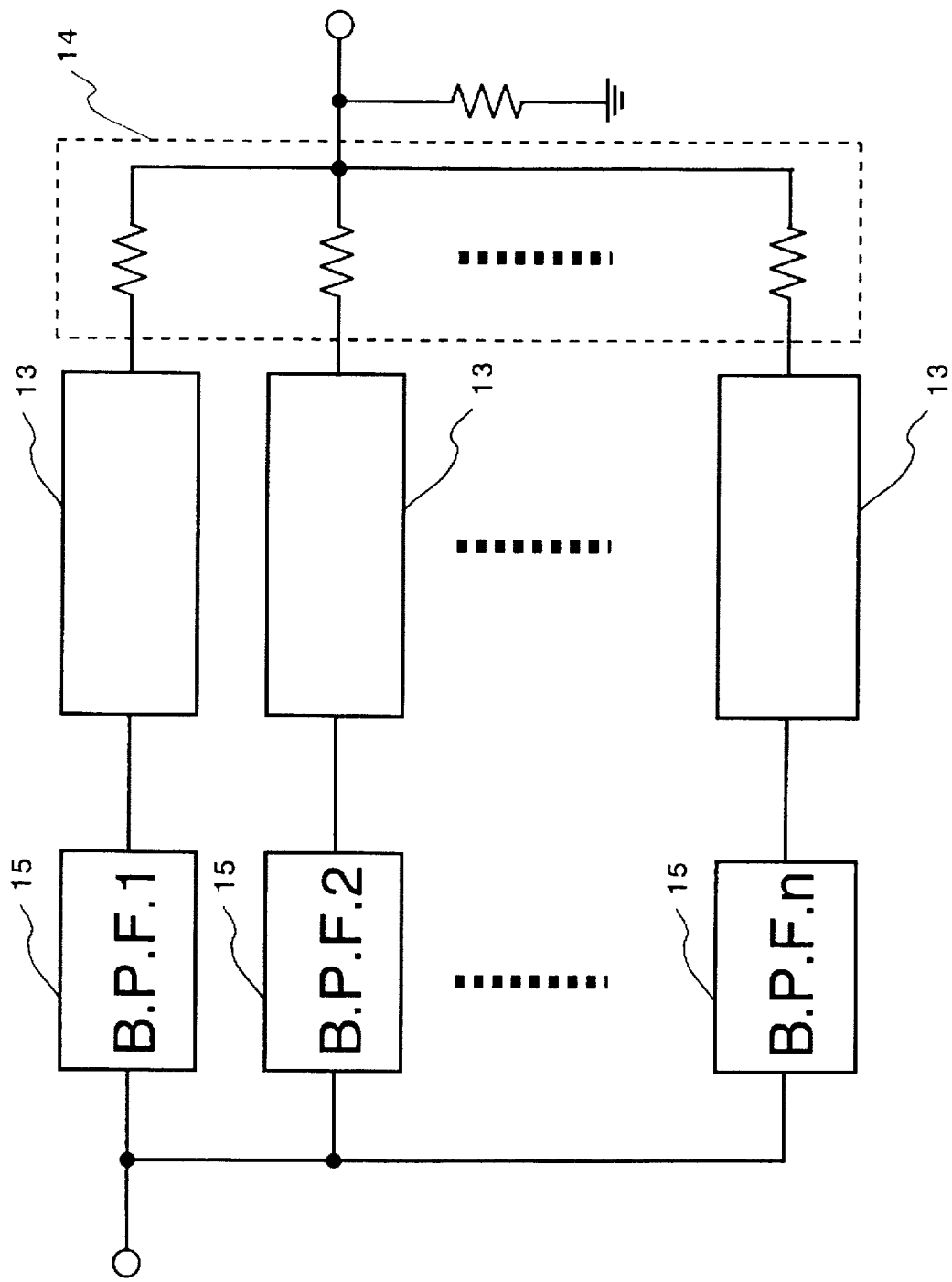
Figure 16:
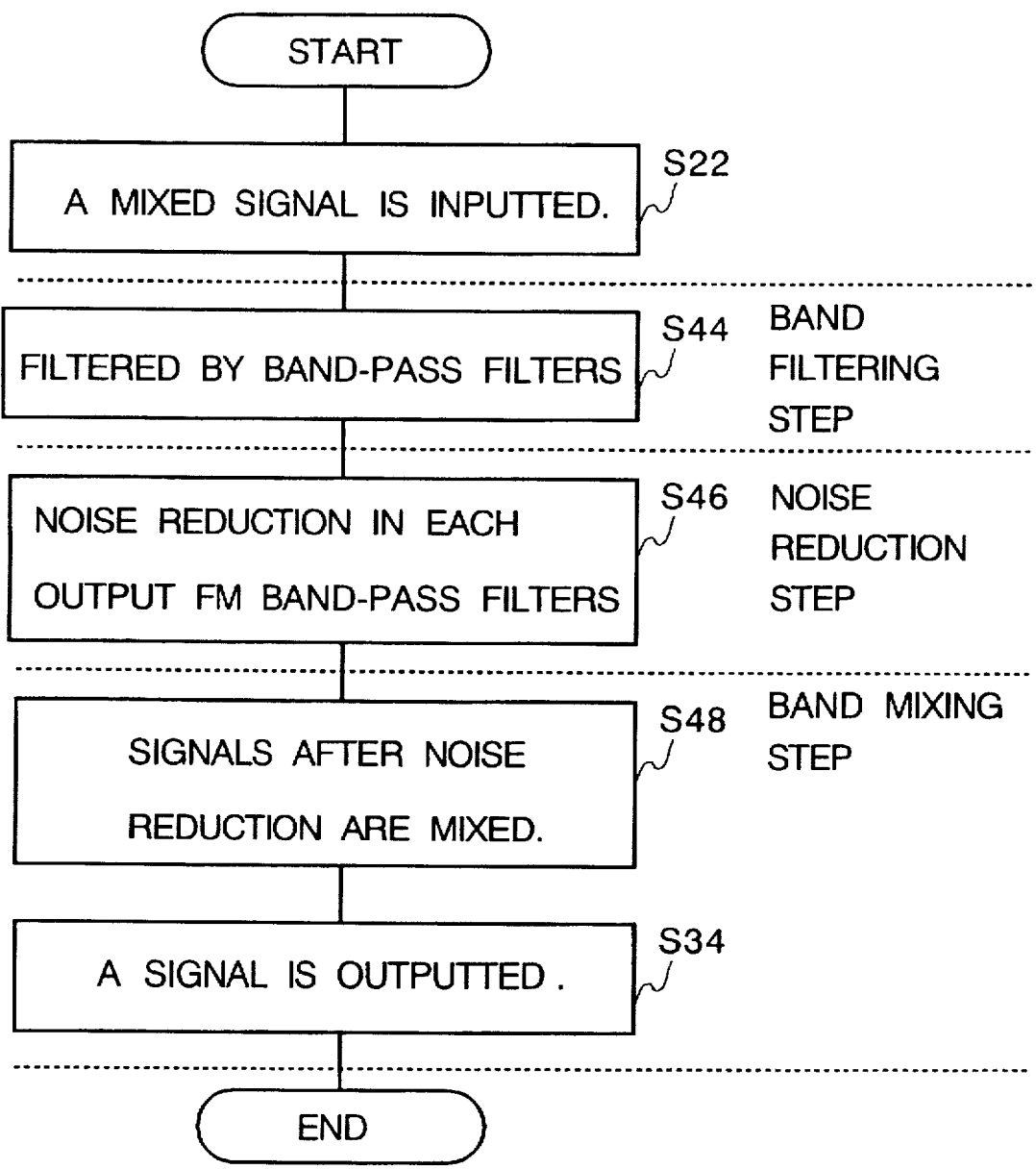
Figure 17:
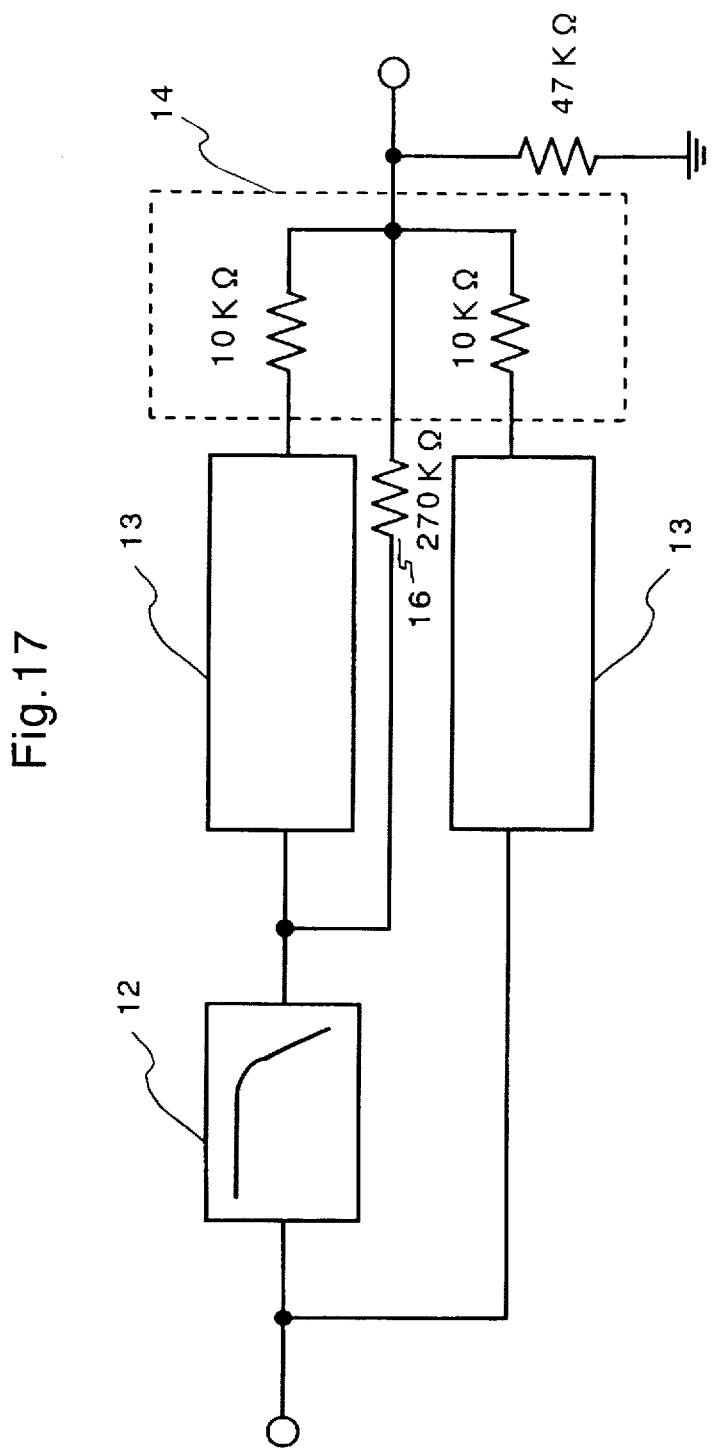
Figure 18:
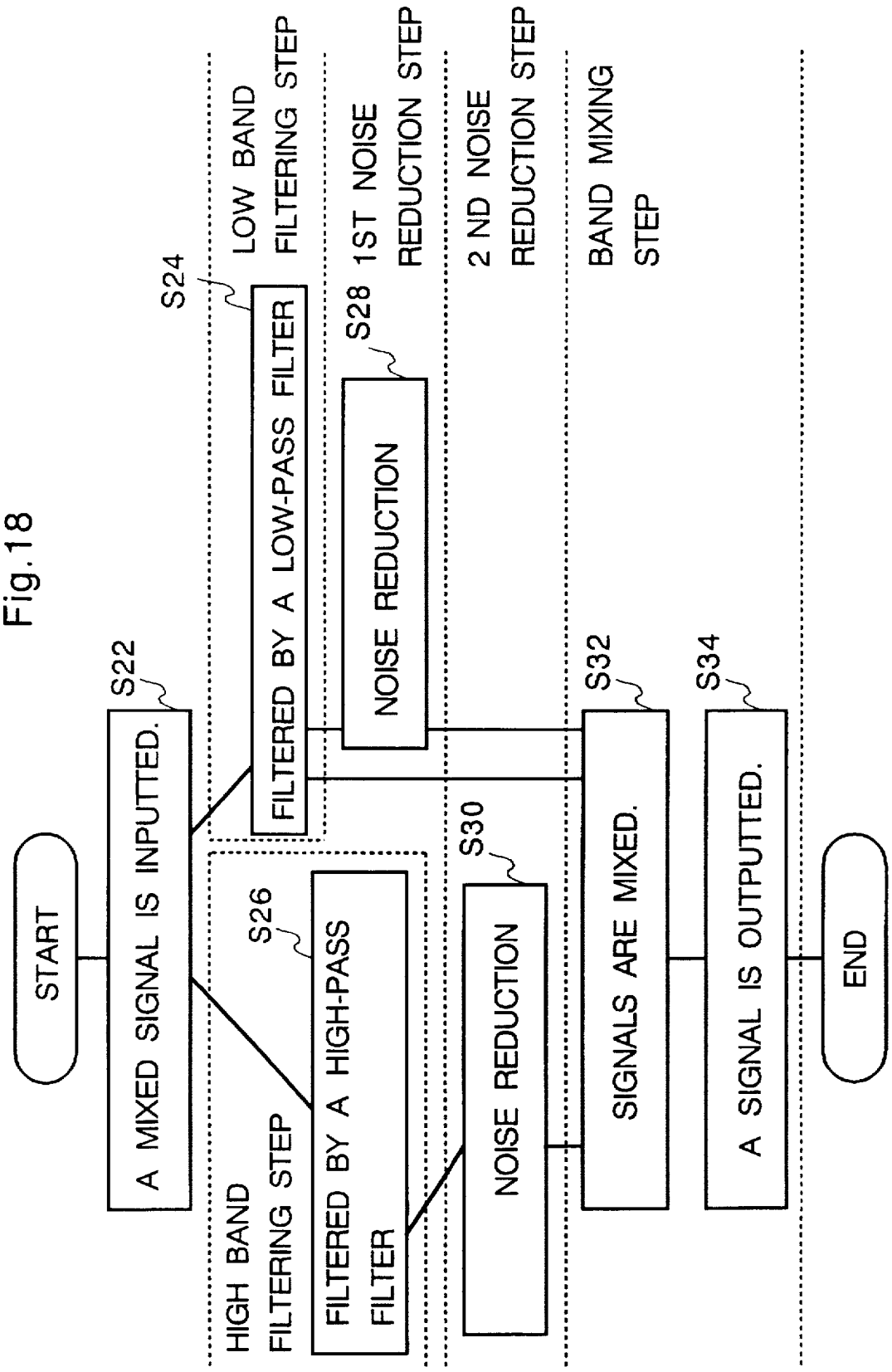
Figure 19:
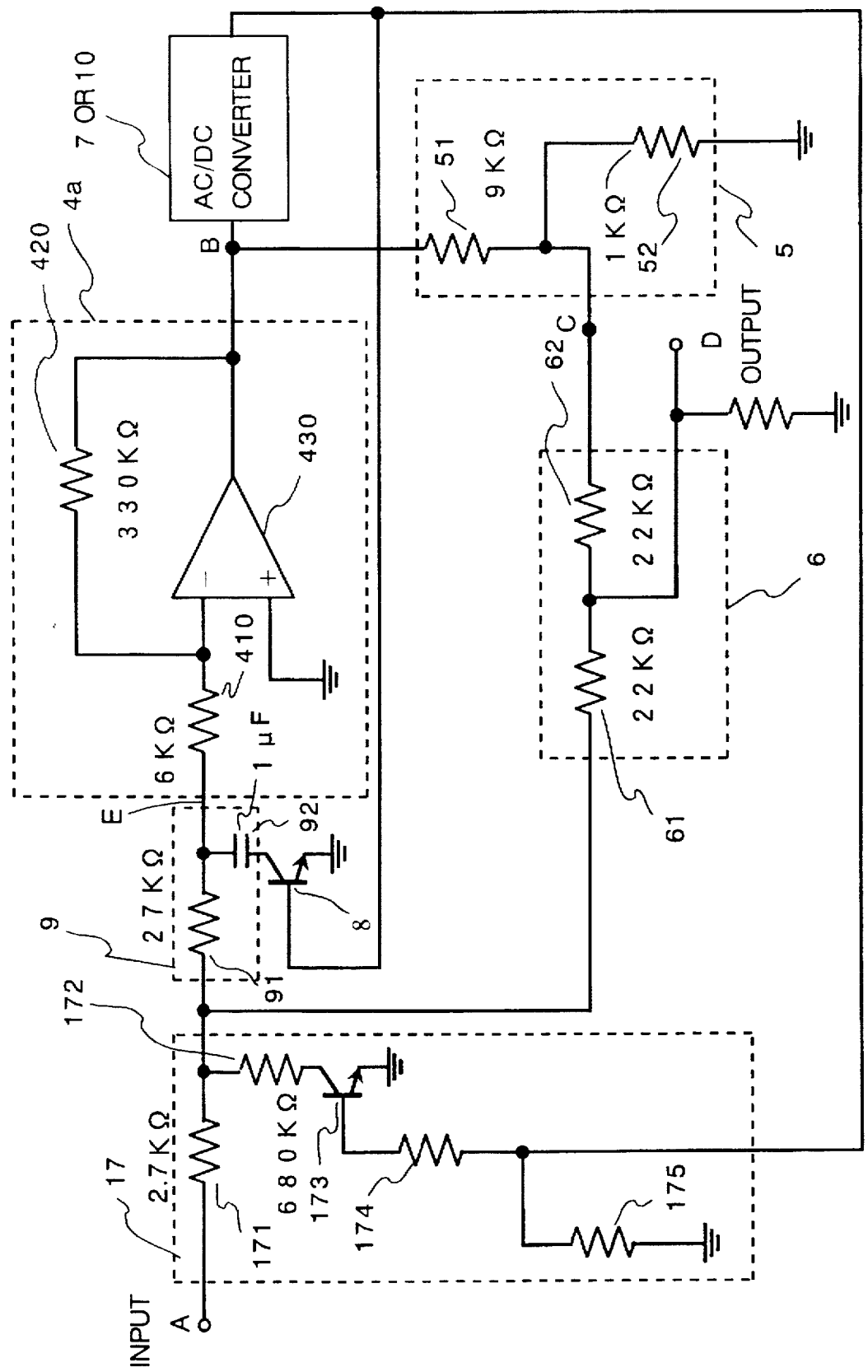
Figure 20A:
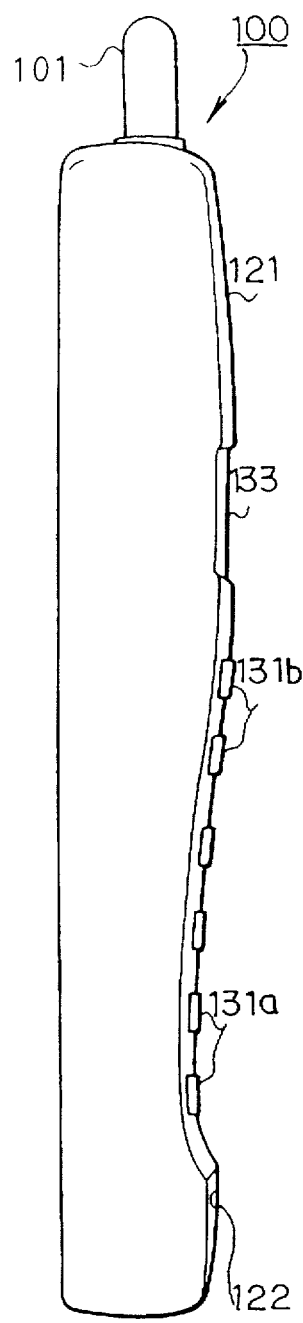
Figure 20B:
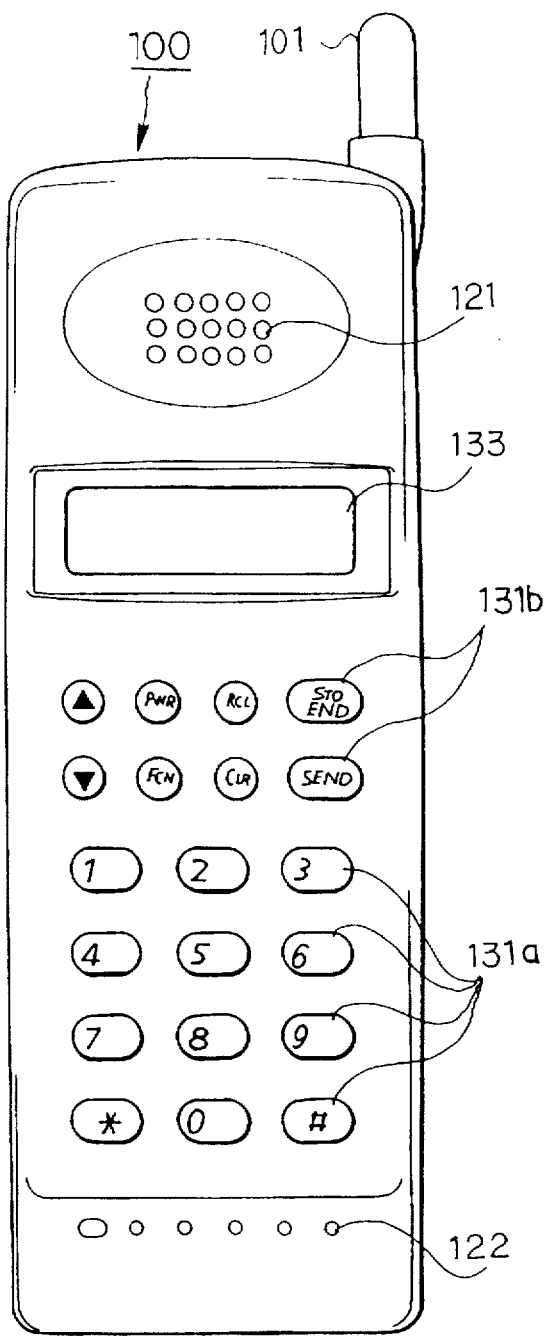
Figure 21:
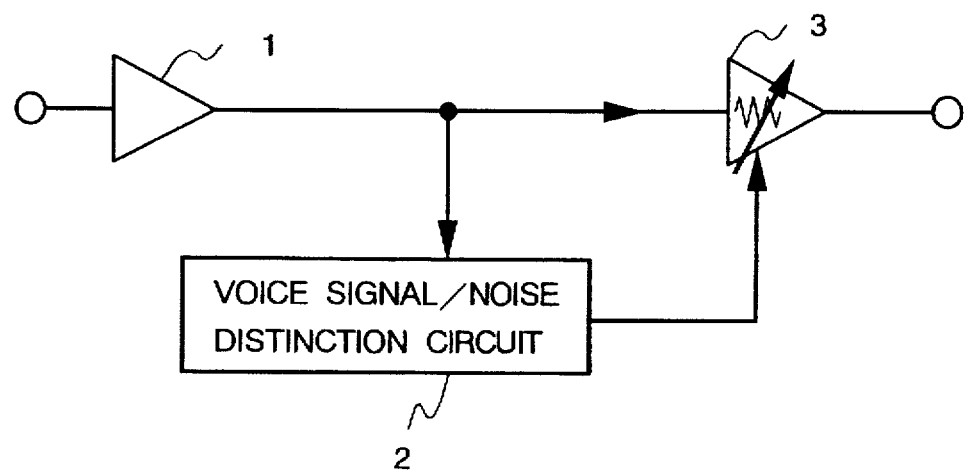
Figure 22:
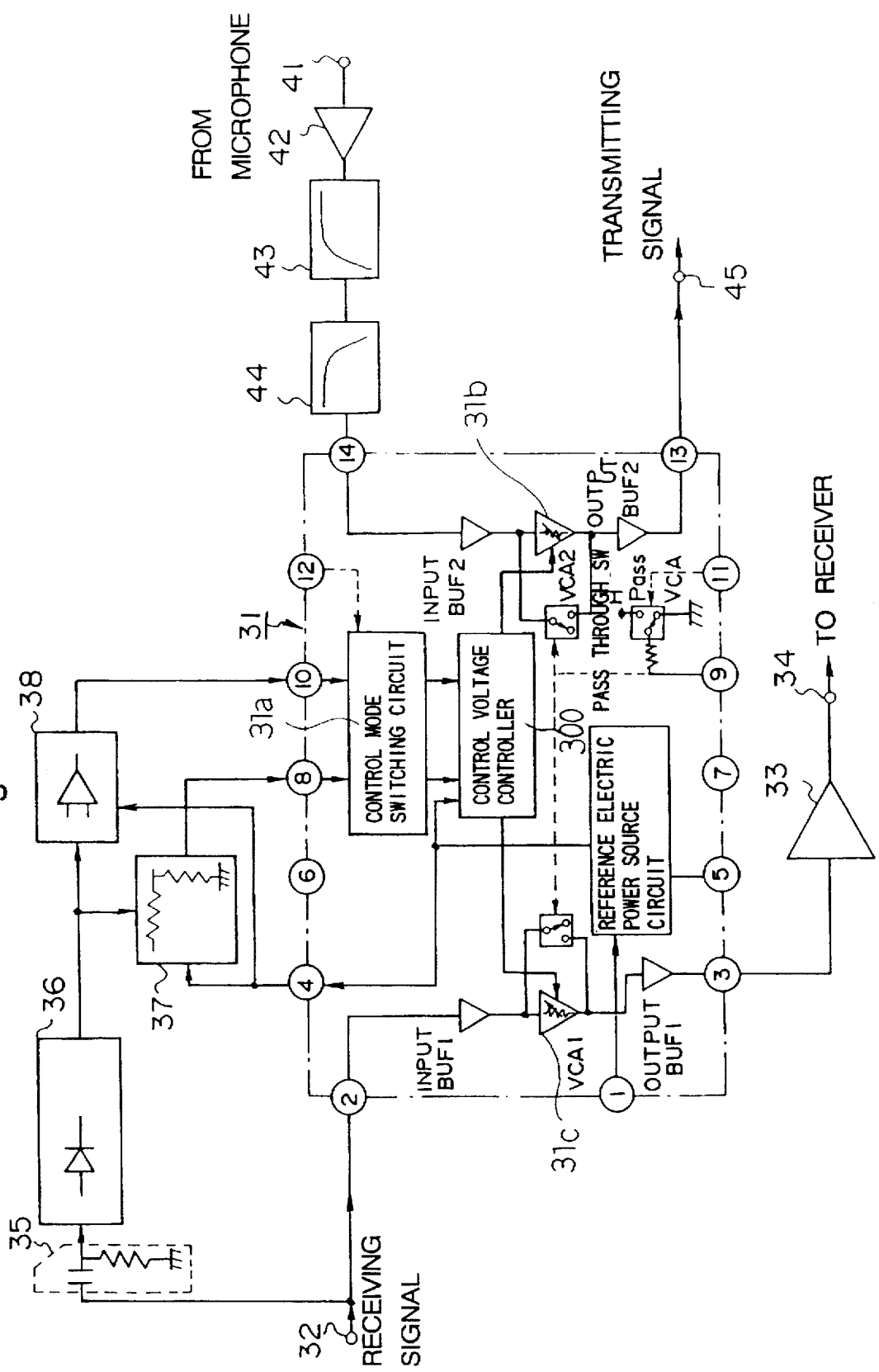
Figure 23:
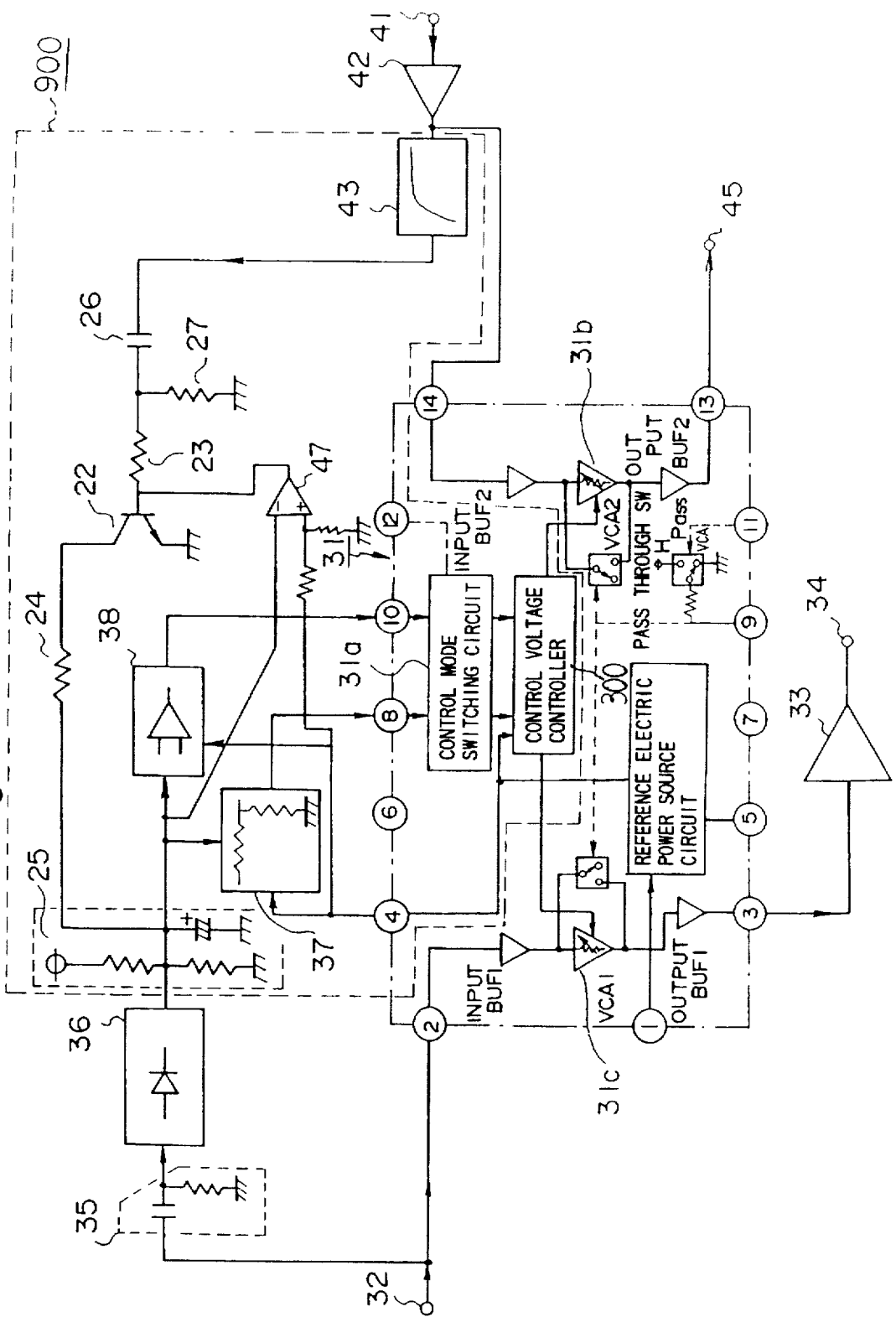
Figure 24:
Figure 25:
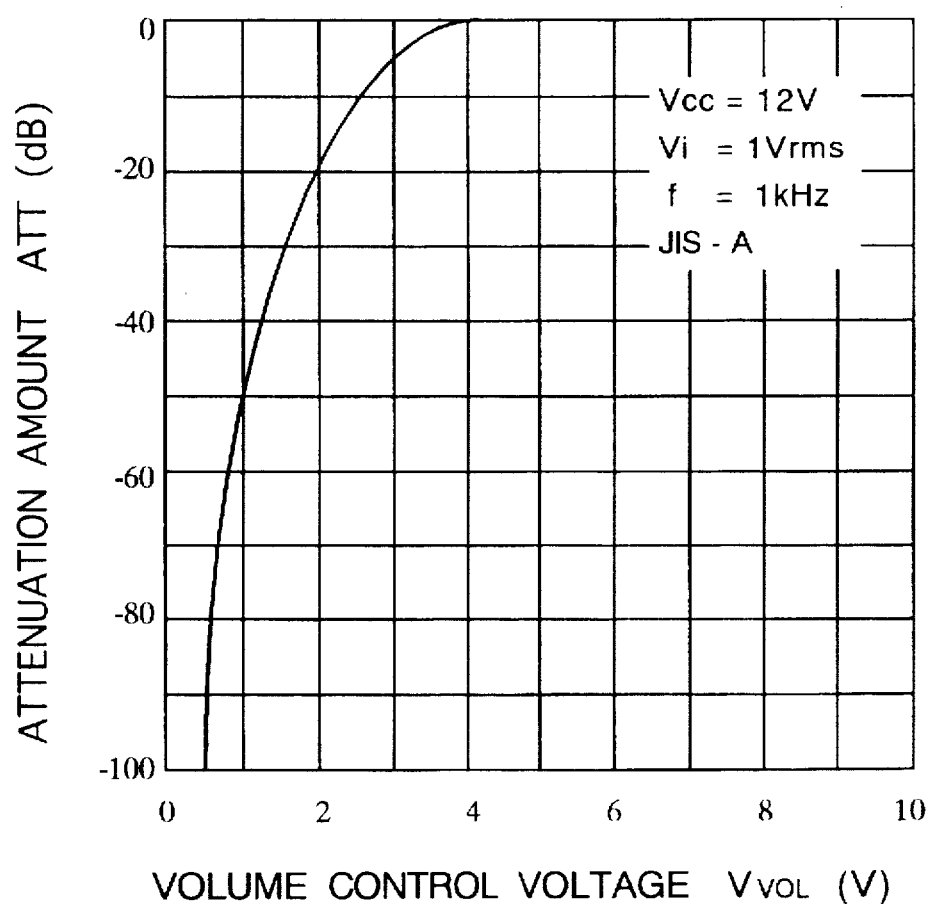
Figure 26:
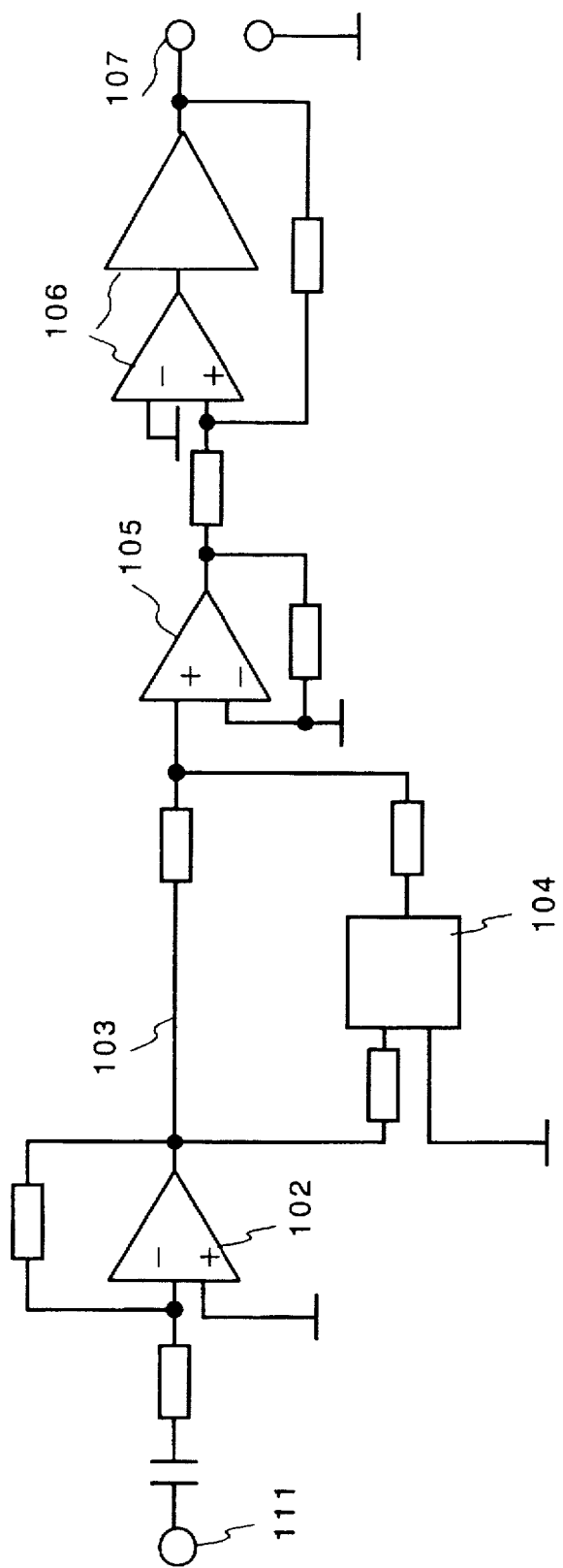

FIG. 15 is a block diagram of a noise reduction apparatus of another embodiment of this invention;

FIG. 16 is a flow chart showing processing steps of the noise reduction apparatus of FIG. 15;

FIG. 17 is a block diagram of a noise reduction apparatus of another embodiment of this invention;

FIG. 18 is a flow chart showing processing steps of the noise reduction apparatus of FIG. 17;

FIG. 19 is a block chart of a noise reduction circuit of another embodiment of this invention;

FIGS. 20A and 20B are external views of an communication apparatus to which the noise reduction circuit or the noise reduction apparatus is applied;

FIG. 21 is a block chart for explaining related art 1;

FIG. 22 is a block diagram of related art 1;

FIG. 23 is another block diagram of related art 1;

FIG. 24 shows the threshold value of the base voltage of a transistor in FIG. 23;

FIG. 25 shows the attenuation amount voltage control voltage characteristic of a variable attenuator. (electronic volume control IC) in FIG. 23; and FIG. 26 is a block diagram of related art 2.

DESCRIPTION OF THE PREFERRED EMBODIMENTS

Embodiment 1.

In embodiment 1, a noise reduction circuit which includes an inverting amplifier with a high gain is explained.

Figure 1:
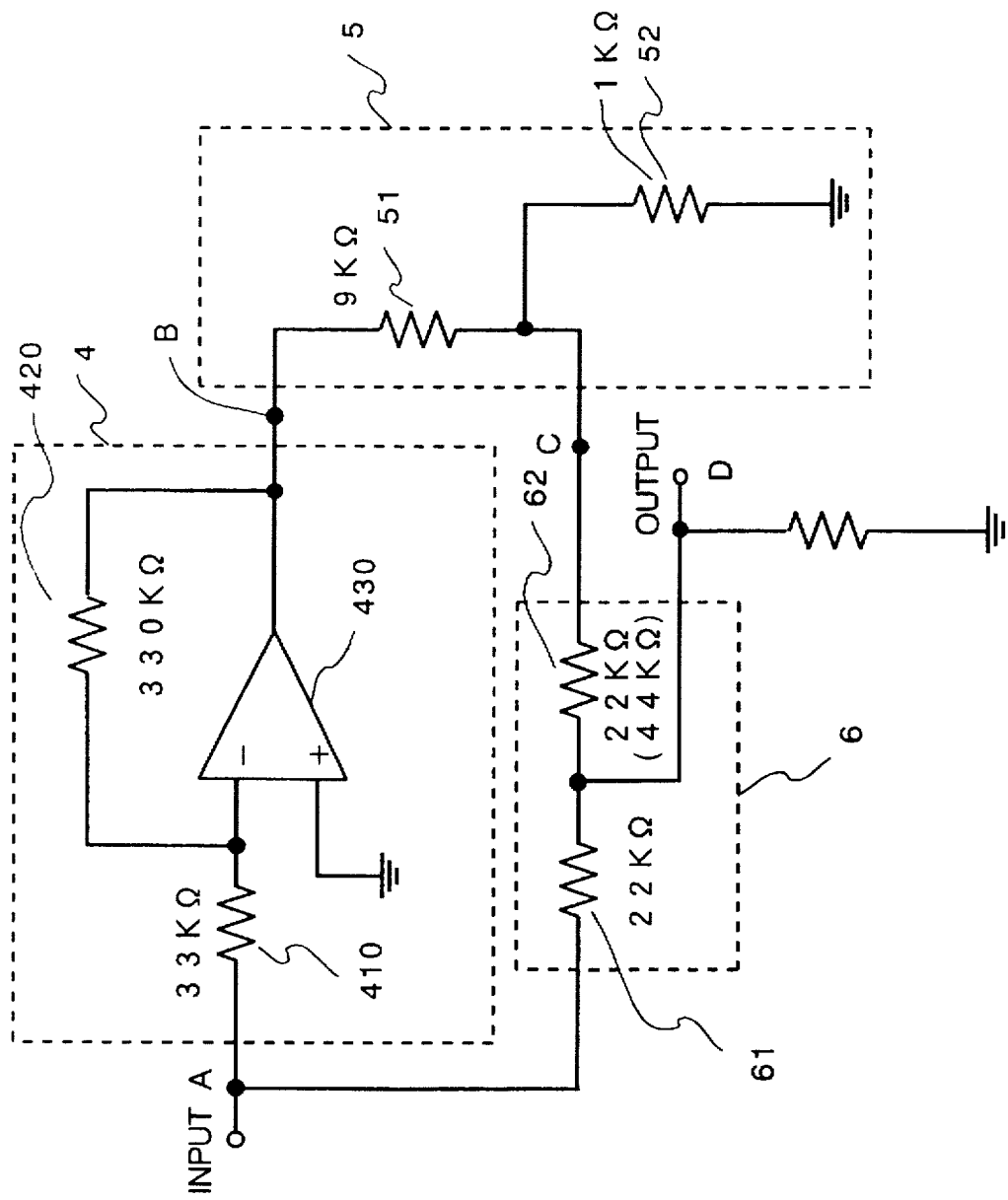
FIG. 1 is a block chart of a noise reduction circuit in one embodiment of this invention.

A configuration of a noise reduction circuit in embodiment 1 is illustrated in a block chart of FIG. 1.

In FIG. 1, the noise reduction circuit in embodiment 1 includes an inverting amplifier 4, an attenuator 5 and a mixer 6.

When a signal is inputted to the inverting amplifier 4, the inverting amplifier 4 inverts the signal and amplifies the inverted signal. The inverting amplifier 4 should have a high gain of at least ten (20 dB). Since the inverting amplifier 4 has a high gain, when the level of the inputted voice signal is higher than the level of the noise, the inverted amplified voice signal is saturated and the amplitude is restricted.

The inverting amplifier 4 includes a resistance 410 of 33 KΩ, a resistance 420 of 330 KΩ and an operational amplifier 430. The operational amplifier 430 is operated with a single electric power source of ±3.5 V. An voltage gain (gain) of the invert amplifier 4 is calculated from values of the resistances as following:

−330 KΩ+33 KΩ=−10

An inputted wave is amplified with a gain of ten times, and a phase of the wave is inverted by the inverting amplifier 4. Thus, an inverted phase wave is outputted.

The attenuator 5 attenuates the signal which is inverted and amplified by the inverting amplifier 4. The attenuator 5 includes a resistance 51 of 9 KΩ and a resistance 52 of 1 KΩ. According to the values of the resistances, the attenuator 5 attenuates the signal, which is inverted and amplified by the inverting amplifier 4, to one-tenth of its original level.

The mixer 6 adds the signal which is attenuated by the attenuator to an input signal, and outputs the result. The mixer 6 includes a resistance 61 of 22 KΩ and a resistance 62 of 22 KΩ. Since values of the resistances 61 and 62 are same at 22 KΩ, the input signal and the output signal from the attenuator are added in a ratio of 1:1.

If the value of the resistance 62 is 44 KΩ and the value of the resistance 61 is 22 KΩ, the input signal and the output

8 signal from the attenuator are added in a ratio of 2:1. In that case, the noise reduction amount of the signal which is outputted from the mixer 6 is reduced to half.

The noise reduction amount is controlled by changing the ratio of values of the resistance 61 and the resistance 62 in the mixer 6. This is the same in other embodiments of this invention.

For purposes of explanation, it is assumed that a noise and voice output circuit (not shown) has an output impedance of 9 KΩ, and is connected to an input point A in FIG. 1.

The noise reduction circuit which is configured as FIG. 1 operates as stated in the following. The case in which only a noise is inputted and the case in which a mixed signal of a noise and a voice signal with a noise is inputted are both explained.

At first, the case in which only the noise is inputted to the noise reduction circuit is explained with reference to FIG. 2.

Figure 2:
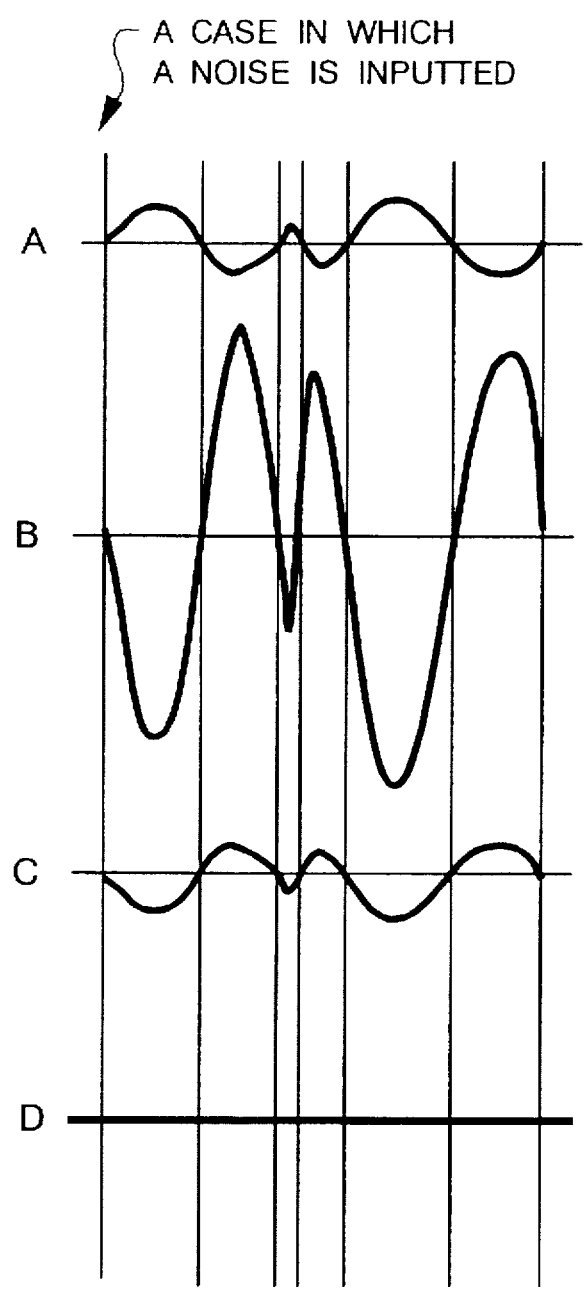
FIG. 2 shows waveforms when noise is inputted to the noise reduction circuit of FIG. 1.

A, B, C and D in FIG. 2 show waveforms of signals at each of points A, B, C and D in FIG. 1.

A signal is inputted at point A in FIG. 1. A waveform of an inputted noise is shown in A of FIG. 2. The level of the noise should not exceed 0.2 Vrms (Volt; Root Mean Square Value) in effective value.

The waveform of a wave which is outputted from the invert amplifier 4 at point B in FIG. 1 is shown in B of FIG. 2. The wave at point B is a wave which is generated by amplifying the wave (noise wave) at point A with a gain of ten times and inverting the phase of the amplified wave. The inverting amplifier 4 saturates at 2 Vrms, and the amplitude of the amplified signal is restricted at 2 Vrms. Since the noise does not exceed 0.2 Vrms, even if the inputted wave (noise wave) is amplified with a gain of ten times, the amplitude of the noise is not restricted.

The wave which is outputted from the attenuator 5 at point C in FIG. 1 is shown in C of FIG. 2. The waveform at point C is substantially an inverted waveform of the waveform at point A. That is because the inputted noise is inverted in phase by the inverting amplifier 4 with a gain of ten times, and attenuated to one-tenth by the attenuator 5.

At point D in FIG. 1, the wave is outputted from the noise reduction circuit. At point D, the output level is close to 0, i.e., the noise is canceled. The wave which is inputted at point A and the wave which is outputted from the attenuator 5 at point C are inverted in phase and the same in amplitude. Therefore, when the wave at point A and the wave at point C are added by the mixer 6, the noise is canceled.

Figure 3:
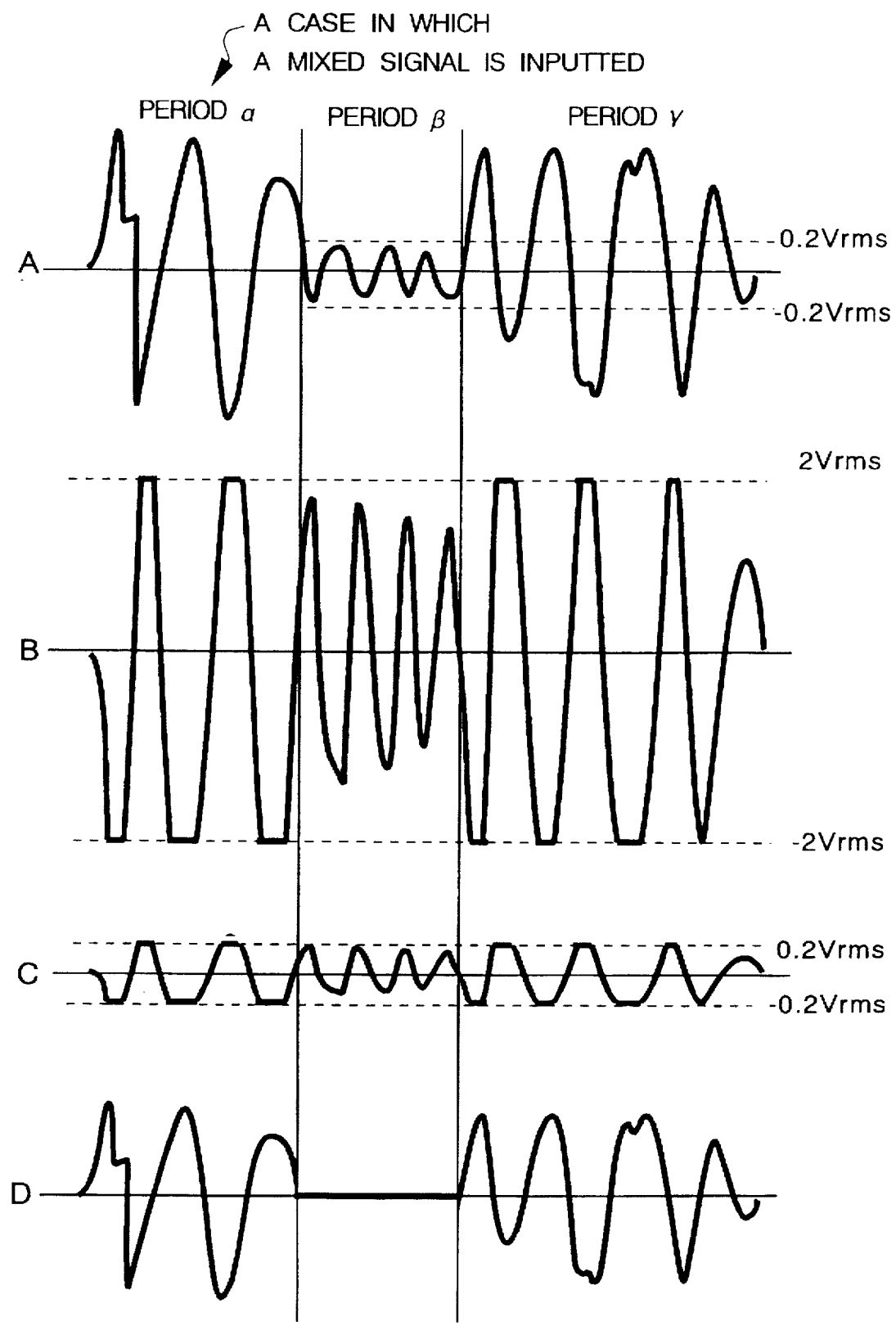
FIG. 3 shows waveforms when a mixed signal is inputted to the noise reduction circuit of FIG. 1.

In FIG. 3, the case in which a mixed signal of noise and a voice signal with noise are inputted is shown. The level of the noise is assumed not to exceed 0.2 Vrms, and the average level of the voice signal with the noise is assumed to be 0.5 Vrms.

In FIG. 3, an input wave is shown in A. An explanation is made for each of periods α, β and γ. In periods α and γ, the wave of the voice signal with the noise is shown, and in period β, the wave of the noise Ls shown.

When the wave which is inputted at point A is inverted in phase by the inverting amplifier 4, the wave which is shown in B of FIG. 3 is generated. Since the gain of the inverting amplifier 4 is set at ten times, when the amplitude of the amplified wave becomes 2 Vrms or more, the inverting amplifier 4 saturates. Therefore, as shown in FIG. 3, the amplitude of the inverted amplified wave is restricted at 2 Vrms in periods α and γ. Since the noise level does not exceed 0.2 Vrms, even if the noise is inverted and amplified with a gain of ten times, the noise does not exceed the saturation limit of 2 Vrms. Hence, the amplitude is not restricted in period β.

The wave which is outputted from the attenuator 5 is shown in C of FIG. 3. The waveform of the noise in period β of C in FIG. 3 is substantially same as the waveform of the wave which is inputted at point A in period β, and inverted in phase. The wave in periods α and γ in C of FIG. 3 is generated by attenuating the wave in periods α and γ of B in FIG. 3 to one-tenth by the attenuator 5.

In D of FIG. 3, the output wave is shown. Since the wave of the noise at point A and the wave at point C which is an inverted wave of the noise are added, the output level is substantially 0. Hence, the noise in period β is canceled.

The waves in periods α and γ in D are waves which are generated by adding the wave of the voice signal with the noise at point A and the wave which is attenuated by the attenuator 5 at point C in the mixer 6. Therefore, the output wave in periods α and γ are waves which are generated by adding (subtracting as the phase is inverted) the wave at point A and the wave at point C in which exceeding parts over 0.2 Vrms is missed due to an amplitude restriction of 0.2 Vrms.

For example, when the level of the input signal is 0.5 Vrms and the level of the wave which is restricted in amplitude at point C is −0.2 Vrms, the wave of the input signal and the wave at point C are added as follows:

$$0.5-0.2=0.3$$

The level of the wave at point D is three-fifth of the input wave. Therefore, in order to output a signal which has the same level with the input signal, the output from point D must be amplified to five-third by another amplifier (which is not illustrated).

As stated, in embodiment 1, when a mixed signal is inputted, the noise is canceled in the period only with the noise, and the voice signal with a noise is outputted completely.

Figure 4:
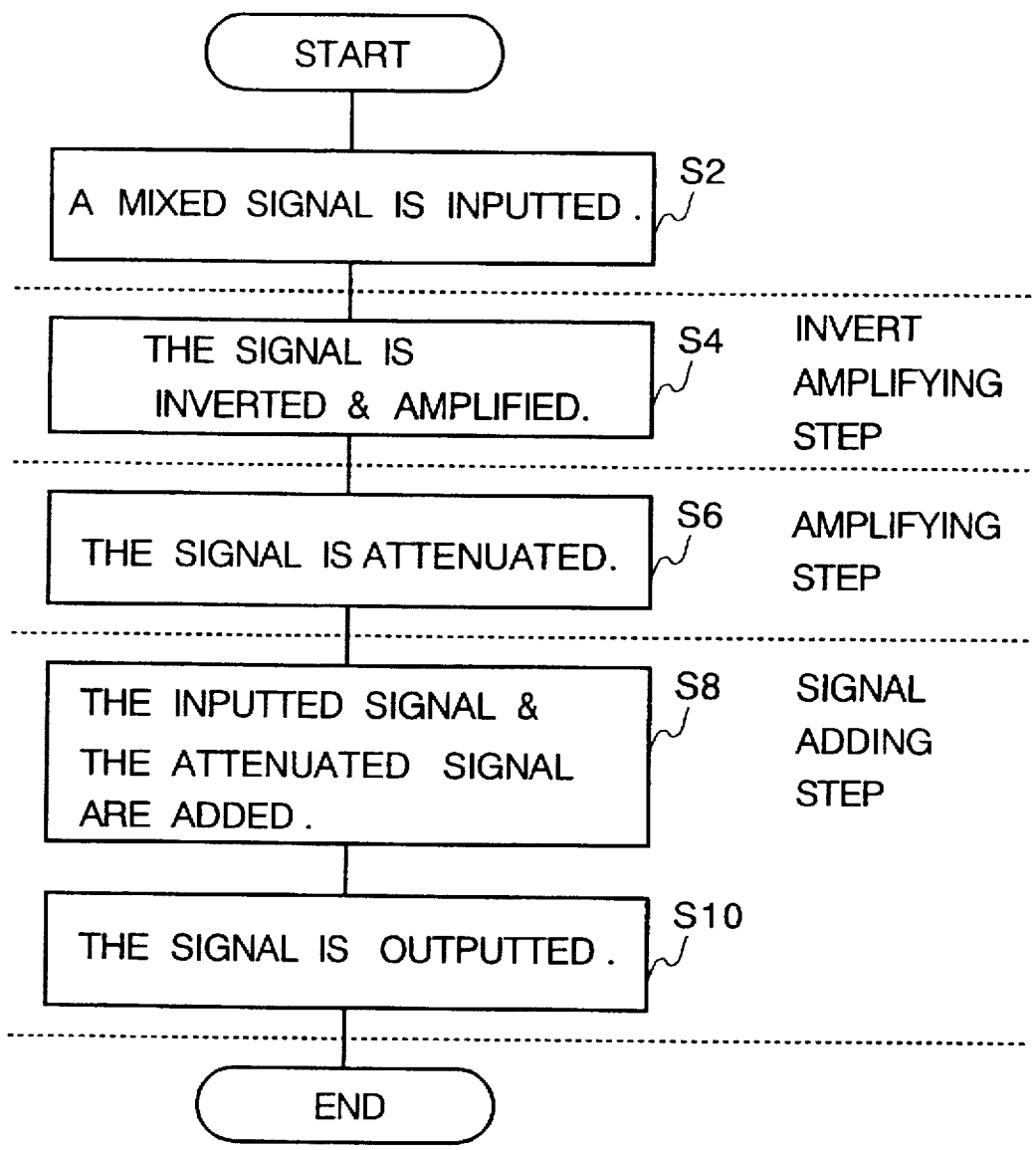
FIG. 4 is a flow chart showing processing steps of the noise reduction circuit illustrated in FIG. 1.

A flow chart of the noise reduction method in embodiment 1 is shown in FIG. 4.

In step S2, a mixed signal is inputted.

In step S4, the signal is inverted and amplified. When the inputted signal is a mixed signal of noise and a voice signal with noise, since the inverting amplifier 4 has a high gain, the voice signal with the noise is restricted in amplitude. Then the voice signal with the noise is inverted and amplified. However, the noise is inverted and amplified without being restricted in amplitude.

In step S6, the inverted amplified signal is attenuated.

In step S8, the inputted signal and the attenuated signal are added.

In step S10, the signal is outputted.

In this process, step S4 is an inverting amplifying step, step S6 is an attenuation step, and steps S8 and S10 are signal adding steps. In the signal adding steps, the noise is canceled; however, the voice signal with the noise is outputted completely.

As stated, in embodiment 1, the noise reduction circuit which includes the inverting amplifier 4 with a high gain, the attenuator 5 and the mixer 6 is explained.

When a mixed signal with noise is inputted, an inverted phase signal is generated via the inverting amplifier 4 which has a high gain and the attenuator 5. Then, the inverted phase signal is added to the inputted signal in the mixer 6.

Therefore, when the mixed signal is inputted, the noise and an inverted phase signal of the noise are added in a period with only noise, and the noise is canceled.

As for the voice signal with the noise, an inverted phase signal is generated by being amplified by the inverting amplifier 4. However, since the gain of the inverting amplifier 4 is high, the amplitude is restricted. The voice signal with the noise is an inverted phase signal which is restricted in the amplitude by the inverting amplifier 4. The inverted phase signal which is restricted in the amplitude is inputted to the attenuator 5, and attenuated by the attenuator 5. Since the signal is restricted in the amplitude, the level of the signal which is outputted from the attenuator 5 is lower than the level of the input signal (the voice signal with the noise). In the mixer 6, even if the input signal (the voice signal with the noise) is added to the inverted phase signal, the input signal is not canceled as in the case in which only the noise is inputted. In this case, the noise in the voice signal is not able to be canceled, either.

As stated, in the noise reduction circuit of embodiment 1, when the mixed signal of the voice signal and the noise is inputted, the noise is canceled in the period with only noise.

For example, when the noise reduction circuit of this invention is provided in a microphone of a portable telephone, background noise is canceled in the no-voice periods during speaking with the microphone. Hence, a pleasant communication condition can be achieved.

Further, according to the noise reduction circuit and the noise reduction method of this invention, the beginning part of communication is not missed, because the noise reduction circuit is very simple and has no delay otherwise caused by a time constant.

Further, the noise reduction circuit and the noise reduction method which does not require an expensive electronic volume control IC can be provided.

Embodiment 2.

Embodiment 2 comprises a noise reduction circuit which includes an auto level controller which keeps the amplitude of an input signal constant without distinguishing the noise and the voice signal with noise, in the case where the noise and the voice signal with the noise are inputted.

Figure 5:
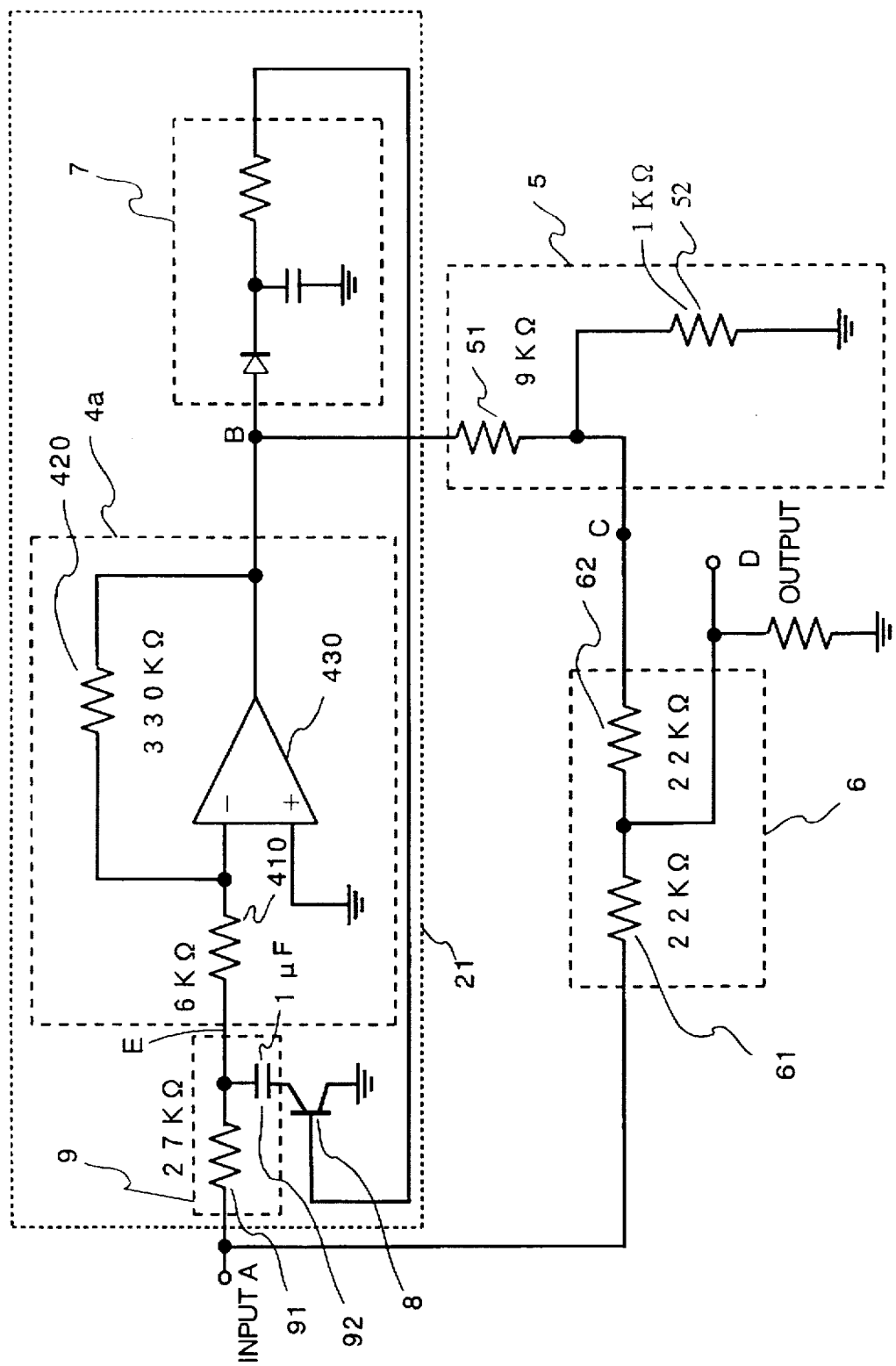
FIG. 5 is a block diagram of a noise reduction circuit of another embodiment of this invention.

A configuration of the noise reduction circuit in embodiment 2 is illustrated in a block diagram of FIG. 5.

In the noise reduction circuit of embodiment 2, an AC (Alternate Current)/DC (Direct Current) converter 7, a transistor 8 and a filter 9 are added to the noise reduction circuit which is illustrated in FIG. 1. Besides, an inverting amplifier 4a has a resistance 410 of 6 KΩ which is different from the value of the resistance 410 in the inverting amplifier 4.

The filter 9 includes a resistor 91 of 27 KΩ and a capacitor 92 of 1 μF. A signal is inputted to the inverting amplifier 4a via the filter 9. Since the resistor 91 in the filter 9 is 27 KΩ and the resistor 410 of the inverting amplifier 4a is 6 KΩ, the voltage gain of a signal at output point B from the inverting amplifier 4a against the voltage gain of the signal at an input point is calculated as follows:

$$-330\ K\Omega \div (27\ K\Omega + 6\ K\Omega) = -10$$

The signal which is outputted from the inverting amplifier 4a is a signal which is generated by inverting a phase of the input signal and amplifying the input signal with a gain of ten. Therefore, the same gain as the noise reduction of embodiment 1 is obtained.

The inverting amplifier 4a, the transistor 8, the filter 9 and the AC/DC converter 7 constitute an auto level controller 21.

The AC/DC converter 7 includes a diode, a resistor and a capacitor, and converts an alternating current to a direct current.

The base of the transistor 8 is connected to an output point of the AC/DC converter 7. The transistor 8 functions as a switch to turn the filter 9 on or off according to an output voltage from the AC/DC converter 7. The filter 9 is turned on and off by the transistor 8, and attenuates the input signal.

The threshold of transistor 8 is 0.6 V. Therefore, a beginning part of the input signal is not missed due to a delay in control of the filter, since the transistor 8 will be switched on or off as the output voltage of AC/DC converter 7 rises and falls past 0.6 V, respectively. Hence, a beginning part of a voice is not missed.

A level to turn the filter 9 on and off is able to be set easily by setting the value of the resistor 91 of the filter 9 and a value of the capacitor 92. Therefore, a level to cancel a noise in the auto level controller 21 is able to be set flexibly by changing the values of the resistor 91 and the capacitor 92.

The auto level controller 21 keeps the same amplitude of the output signal from point B, even if the amplitude of the input signal is changed.

The attenuator 5 includes a resistor 51 of 9 K$\Omega$ and a resistor 52 of 1 K$\Omega$. The mixer 6 includes a resistor 61 of 22 K$\Omega$ and a resistor 62 of 22 K$\Omega$. Since the values of the resistor 61 and the resistor 62 are the same, the input signal and the output signal from the attenuator 5 are added at a ratio of 1:1.

When the value of the resistor 62 is changed to 44 K$\Omega$, the input signal and the output signal from the attenuator 5 are added at a ratio of 2:1. In that case, the noise reduction amount of the signal which is outputted from the mixer 6 is reduced to half.

The noise reduction amount is able to be controlled by changing the ratio of the value of the resistor 61 and the value of the resistor 62 in the mixer 6.

For purposes of explanation, the voice output circuit (not shown) is assumed to have an output impedance of 9 K$\Omega$, and to be connected to the input point A in FIG. 5.

The noise reduction circuit of embodiment 2 operates as follows.

Figure 6:
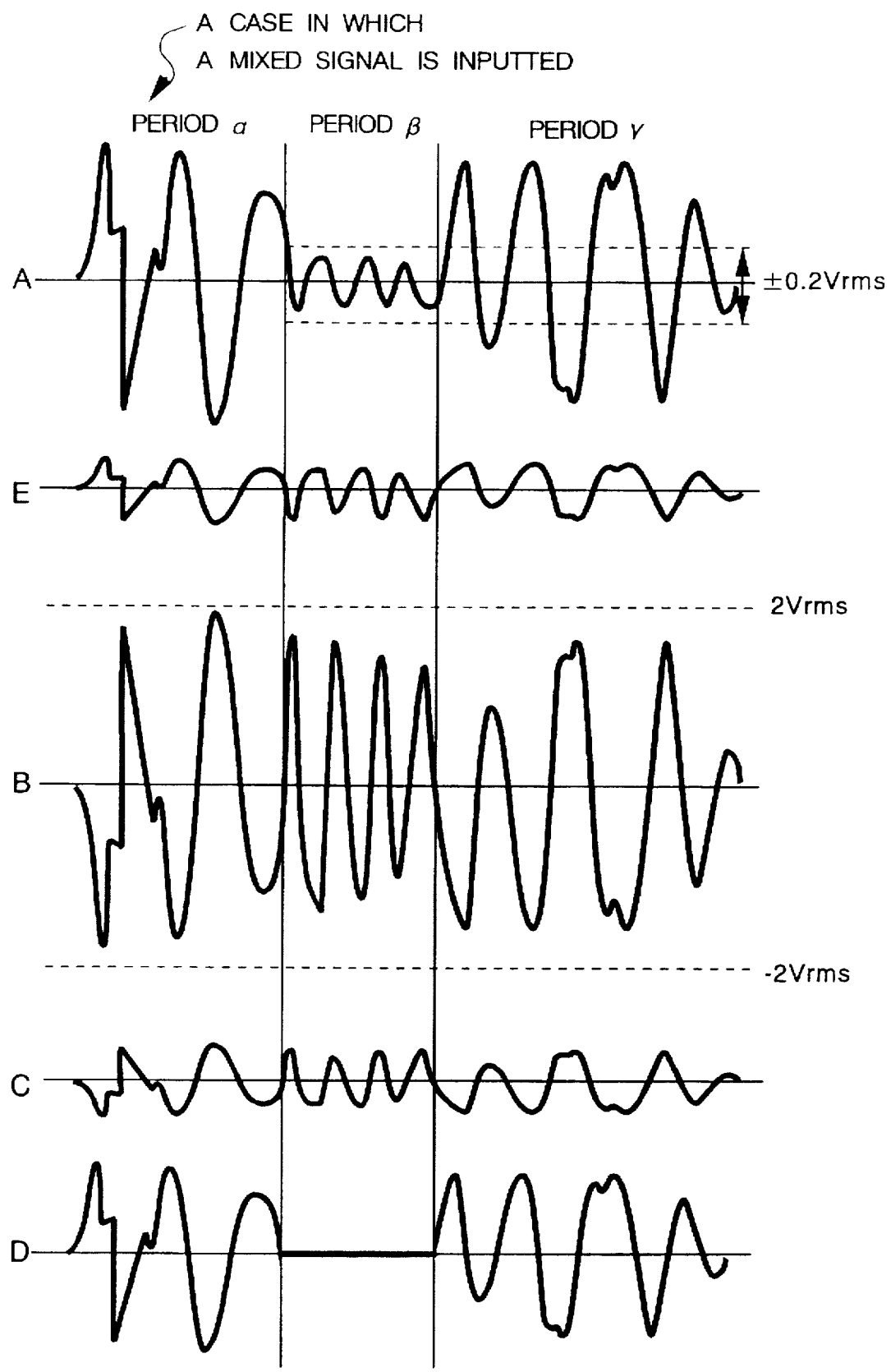
FIG. 6 shows waveforms when a mixed signal is inputted to the noise reduction circuit of FIG. 5.

In FIG. 6, waveforms at points A to E in FIG. 5 are shown.

When a mixed signal of a voice signal plus noise is inputted, the noise reduction circuit operates as follows.

A wave which is inputted at point A in FIG. 5 is shown in A of FIG. 6. The wave shows a waveform of the voice signal plus noise in periods $\alpha$ and $\gamma$. The wave shows a waveform of the noise in period $\beta$. The signal level of the noise is assumed not to exceed 0.2 Vrms. An average level of the voice signal with the noise is assumed to be 0.5 Vrms.

A wave at point E in FIG. 5 is shown in E of FIG. 6.

The wave in E of FIG. 6 shows a waveform which is generated when the inputted mixed signal has passed through the filter 9. The auto level controller 21 controls the amplitudes of the voice signal plus noise and the noise only at almost the same levels. Hence, the amplitudes in periods $\alpha$, $\beta$ and $\gamma$ are almost the same as shown in E of FIG. 6.

Besides, an amplitude in period $\beta$ in A and the amplitude in period $\beta$ in E are in a ratio of approximately 1:(2/11).

A wave which is shown in B of FIG. 6 is a waveform which is outputted from the inverting amplifier 4a. The amplitude of the waveform at point B is 55 times that of the waveform at point E. The voltage gain of the inverting amplifier 4a against a signal at point E is calculated as follows:

$$-330\ K\Omega \div 6\ K\Omega = -55$$

In comparing each of the waveforms of the noise in period $\beta$, the amplitude which is inverted and amplified at point B is ten times that of the noise level at point A, i.e., $\pm 2$ Vrms or less. As for the voice signal plus noise in periods $\alpha$ and $\gamma$, the auto level controller 21 attenuates the signal so that the amplitude of the signal becomes within $\pm 2$ Vrms. Therefore, the amplitude is not restricted due to saturation at $\pm 2$ Vrms as in embodiment 1.

If the amplitude is not attenuated to within $\pm 2$ Vrms due to a malfunction of the auto level controller 21, the operational amplifier 430 restricts the amplitude at a saturation level of $\pm 2$ Vrms as in embodiment 1.

A waveform at point C in FIG. 5 is shown in C of FIG. 6.

The wave in C of FIG. 6 shows a waveform which is generated by attenuating the wave at point B to one-tenth its value by the attenuator 5. The wave plus noise in period $\beta$ shows a waveform which is generated by inverting a phase of the waveform of the noise in period $\beta$ at point A. Therefore, the amplitudes are almost the same.

A waveform at point D in FIG. 5 is shown in D in FIG. 6. It is an output wave from the mixer 6. The noise in period $\beta$ is canceled. The voice signal plus noise in periods $\alpha$ and $\gamma$ has an amplitude of almost three-fifths the input wave.

When the input signal is only noise, the explanation is same as the explanation of FIG. 2.

For the noise reduction circuit in embodiment 2, the auto level controller 21 is added to the noise reduction circuit in embodiment 1. Since the auto level controller 21 is added, the waveform of the output signal becomes smoother than the waveform of the output signal in embodiment 1. Hence, distortion of sound is reduced. In reference to FIGS. 7 and 8, this reason is explained in the following.

Figure 7:
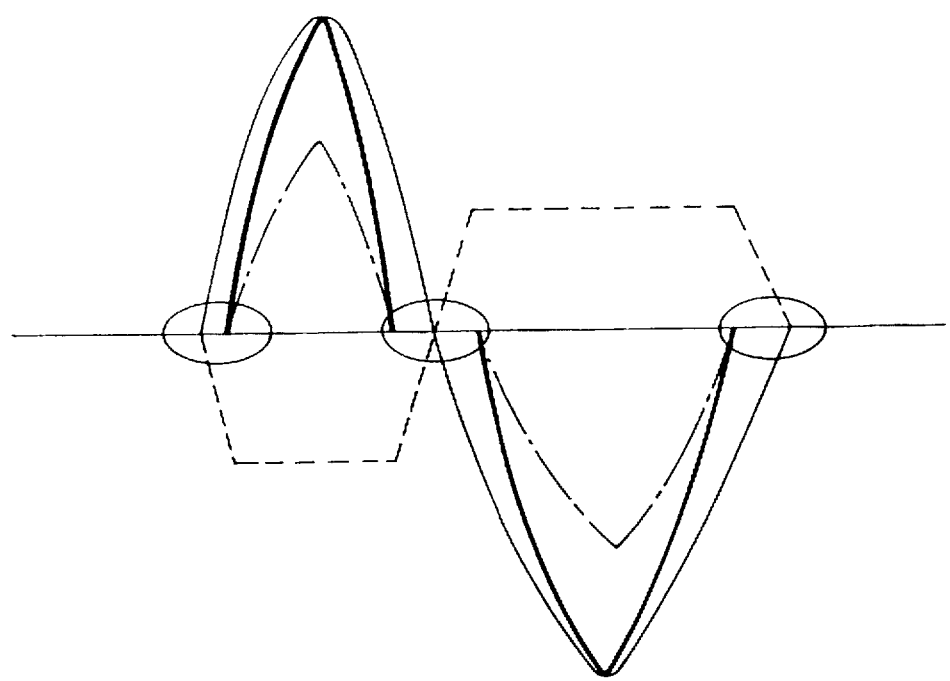
FIG. 7 is an explanatory drawing of a waveform of a wave which is outputted from the noise reduction circuit of FIG. 1.

In FIG. 7, a wave which Is outputted from the noise reduction circuit of FIG. 1 according to embodiment 1 is shown. For purposes of explanation, a part of the wave is extended in size.

An input signal is a voice signal plus noise. The input waveform is shown by a thin line. The waveform which is saturated at $\pm 2$ Vrms in C of FIG. 3 is shown by a broken line. The output waveform from the noise reduction circuit in FIG. 1 which is a waveform generated by adding the waveform of the wave which is saturated at $\pm 2$ Vrms to the waveform of the input wave is shown by a dot-dash line. A waveform of the wave which is generated by amplifying the output waveform from the noise reduction circuit of FIG. 1 (the waveform shown in the dot-dash line) is shown by a bold line. It is amplified by five-thirds compared to the input signal. In FIG. 7, parts which are enclosed in circles are parts in which the waveforms are discontinuous. As shown in FIG. 7, when the output waveform from the noise reduction circuit in FIG. 1 is extended in size, it becomes clear that the output waveform is distorted. Therefore, a distorted sound signal is outputted.

Figure 8:
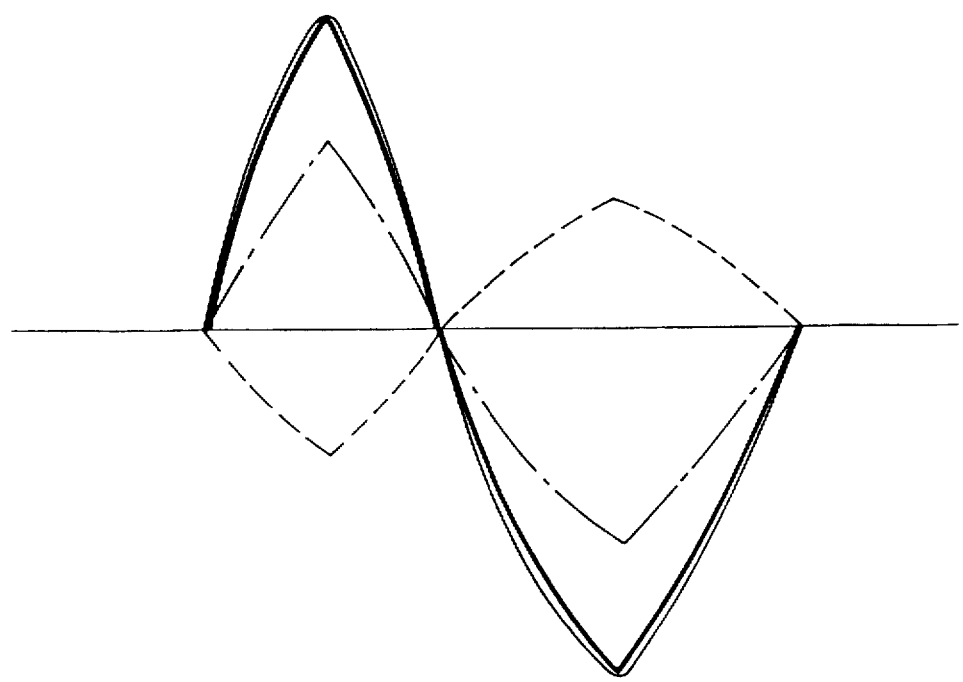
FIG. 8 is an explanatory drawing of a waveform of a wave which is outputted from the noise reduction circuit of FIG. 5.

In FIG. 8, the waveform of a wave which is outputted from the noise reduction circuit in embodiment 2 is explained.

In FIG. 8, the input waveform is shown by a thin line. The input wave is a voice signal plus noise. In FIG. 8, a wave at C in FIG. 6 is shown by a broken line. It is a wave which is outputted from the attenuator 5 in FIG. 5. Since the auto level controller 21 attenuated the voice signal with the noise, the wave is not restricted in amplitude. A wave which is outputted from the noise reduction circuit in FIG. 5 is shown by a dot-dash line. It is produced by adding the waveform of the inputted wave and the waveform in the broken line. The waveform in a dot-dash line is amplified by five-thirds to match the signal level with the level of the input signal. The amplified waveform is shown by a bold line. The waveform with the bold line is almost the same as the input waveform. In FIG. 8, the waveform is not discontinuous as in FIG. 7. Since the waveform is improved, the distortion in sound is reduced.

In embodiment 2, a level to turn the filter 9 ON/OFF by the transistor 8 is able to be set by setting a value of the resistor 91 and the value of the capacitor 92 in the filter 9. The level to cancel noise in the auto level controller 21 is able to be set precisely by controlling the values of the resistor 91 and the capacitor 92.

Figure 9:
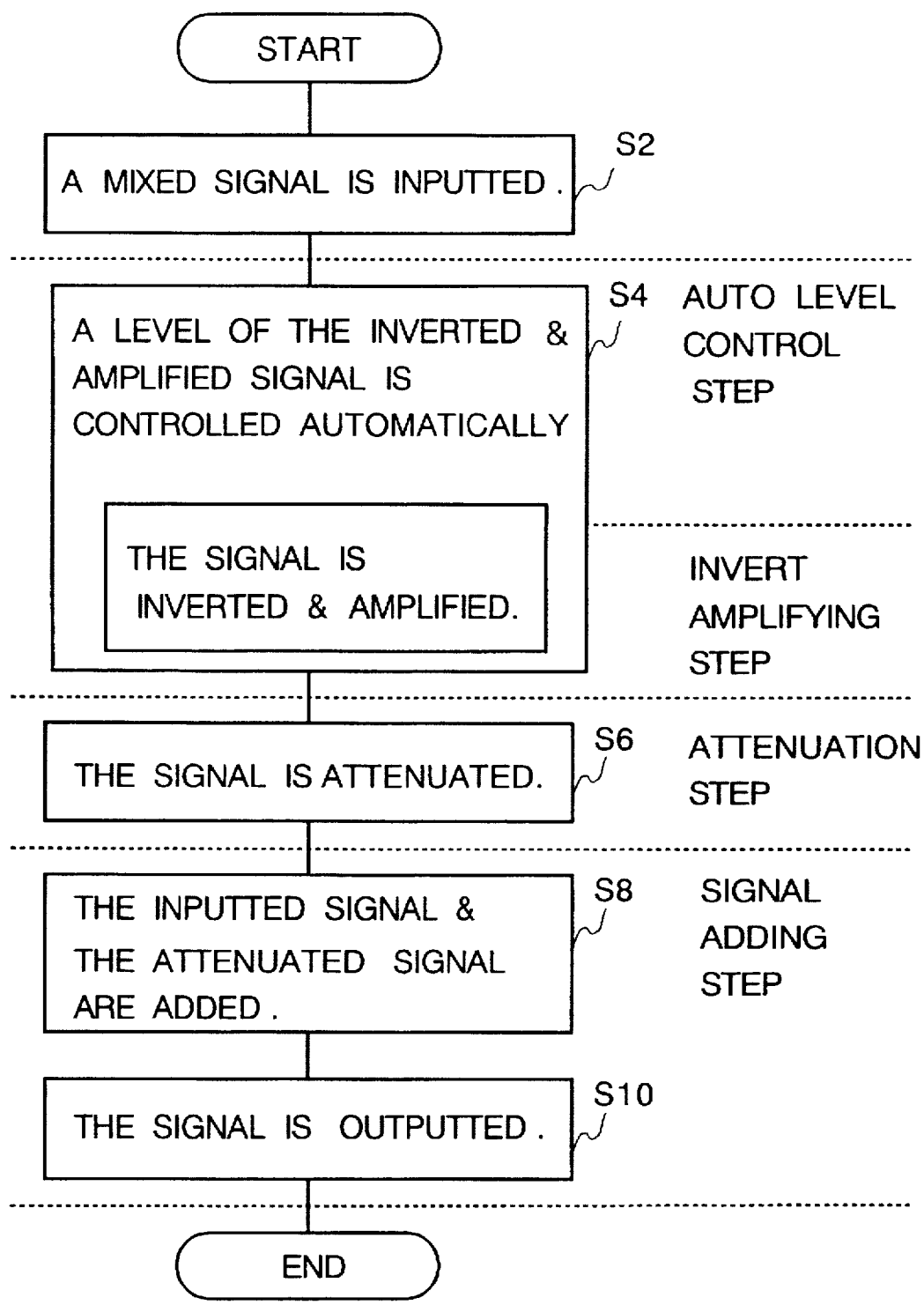
FIG. 9 is a flow chart showing processing steps of the noise reduction circuit of FIG. 5.

A flow chart of noise reduction in embodiment 2 is shown in FIG. 9.

In step S2, a mixed signal is inputted.

In step S4, the level of an inverted amplified signal is controlled automatically, and the levelcontrolled signal is inverted and amplified. Step S4 is an auto level control step which includes an inverting and amplifying step.

In step S6, the signal is attenuated.

In step S8, the input signal and the attenuated signal are added together.

In step S10, the signal is outputted.

The step S6 is an attenuation step, and steps S8 and S10 are signal adding steps.

As stated, the noise reduction circuit in embodiment 2 includes the auto level controller 21. Therefore, when a mixed signal of noise and a voice signal is inputted, the noise is canceled in the period with only noise without distinguishing the noise from the voice.

According to the noise reduction circuit in embodiment 2, background noise is able to be canceled, and distortion of a voice signal is reduced. Hence, a clear sound is outputted.

Further, since the filter is controlled by the transistor and is controlled without delay, a beginning part of the voice is not missed due to delay in control.

Besides, since an electronic volume IC is not necessary, costs are reduced.

Embodiment 3.

Figure 10:
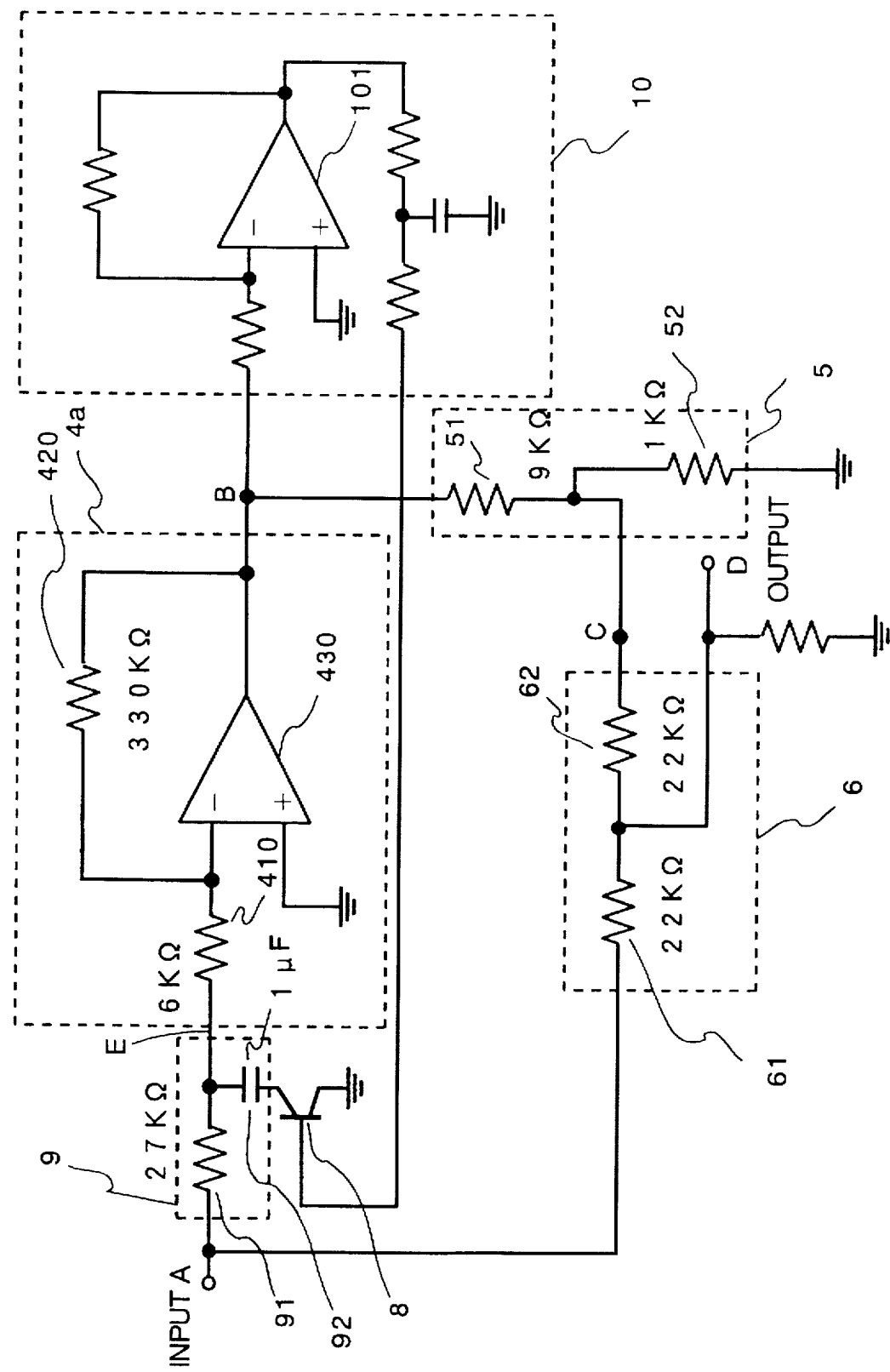
FIG. 10 is a block diagram of a noise reduction circuit of still another embodiment of this invention.

The noise reduction circuit in embodiment 3 is illustrated in FIG. 10.

The AC/DC converter 7 of FIG. 5 is replaced in FIG. 10 with an AC/DC converter 10 which includes a half-wave amplifier.

An operational amplifier 101 in the AC/DC converter 10 is operated by a D.C. electric power source. A wave which is inputted to the AC/DC converter 10 is in a waveform of B in FIG. 6, for example. The AC/DC converter 10 amplifies only a positive side of the waveform at point B. The AC/DC converter 10 also smoothes the waveform by two resistances and a capacitor, and converts an AC signal to a DC signal. The transistor 8 is turned on and off by an output voltage from the AC/DC converter 10 which includes the half-wave amplifier.

Since other elements are the same as the elements in embodiment 2, explanations are omitted. Further, operation of the noise reduction circuit in embodiment 3is the same as the operation of the noise reduction circuit in embodiment 2. Therefore, explanations as to operation are also omitted.

In embodiment 3, since the AC/DC converter 10 which includes the half-wave amplifier is provided, the same function as embodiment 2 is realized with a simpler circuit than the circuit of embodiment 2.

Embodiment 4.

In embodiment 4, different noise reduction amounts are set in a band with a high noise level and a band with a low noise level respectively, and noise reduction processing is performed by the noise reduction apparatus in each of the bands respectively.

Figure 11:
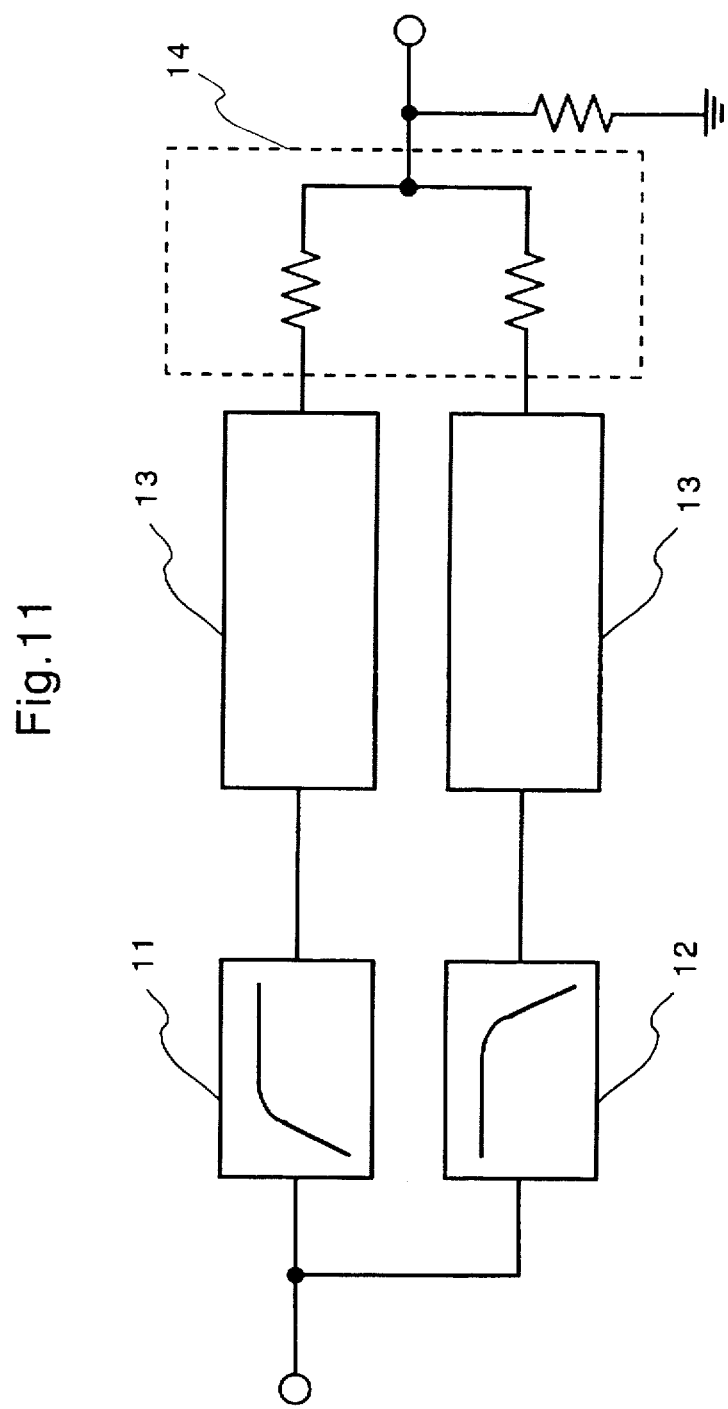
FIG. 11 is a block diagram of a noise reduction apparatus of a further embodiment of this invention.

A configuration of the noise reduction apparatus in embodiment 4 is illustrated in FIG. 11.

In FIG. 11, the noise reduction apparatus includes a high-pass filter 11, a low-pass filter 12, two noise reduction circuits 13, and a band mixer 14 which mixes a signal in a low band and a signal in a high band. For the noise reduction circuit 13, one of the noise reduction circuits in embodiments 1–3 is provided.

An input signal is filtered by the high-pass filter 11 and the low-pass filter 12. Noise in a signal in a high band which has passed through the high-pass filter 11 and in a signal in a low band which has passed through the low-pass filter 12 is reduced in each of the noise reduction circuits 13. The signal in the high band and the signal in the low band after noise reduction are mixed together in the band mixer 14, and outputted.

In order to control the noise reduction amount in each of a band with a high frequency noise level and a band with a low frequency noise level respectively, the noise reduction amount which is set in the noise reduction circuit 13 which is connected to the high-pass filter 11 and the noise reduction amount which is set in the noise reduction circuit 13 which is connected to the low-pass filter 12 must be predefined respectively.

In order to define the noise reduction amount in the noise reduction circuits 13, a ratio of the resistor 61 and the resistor 62 is controlled in the mixer 6 in FIG. 5.

For example, when both of the resistance of resistor 61 and the resistance of resistor 62 in the mixer 6 are 22 KΩ, the noise is canceled. When the resistance of resistor 61 is 22 KΩ and the resistance of resistor 62 is 44 KΩ, the noise reduction amount is reduced to half. As stated, the noise reduction amount is able to be controlled by controlling values of two resistances in the mixer in the noise reduction circuit.

Figure 12:
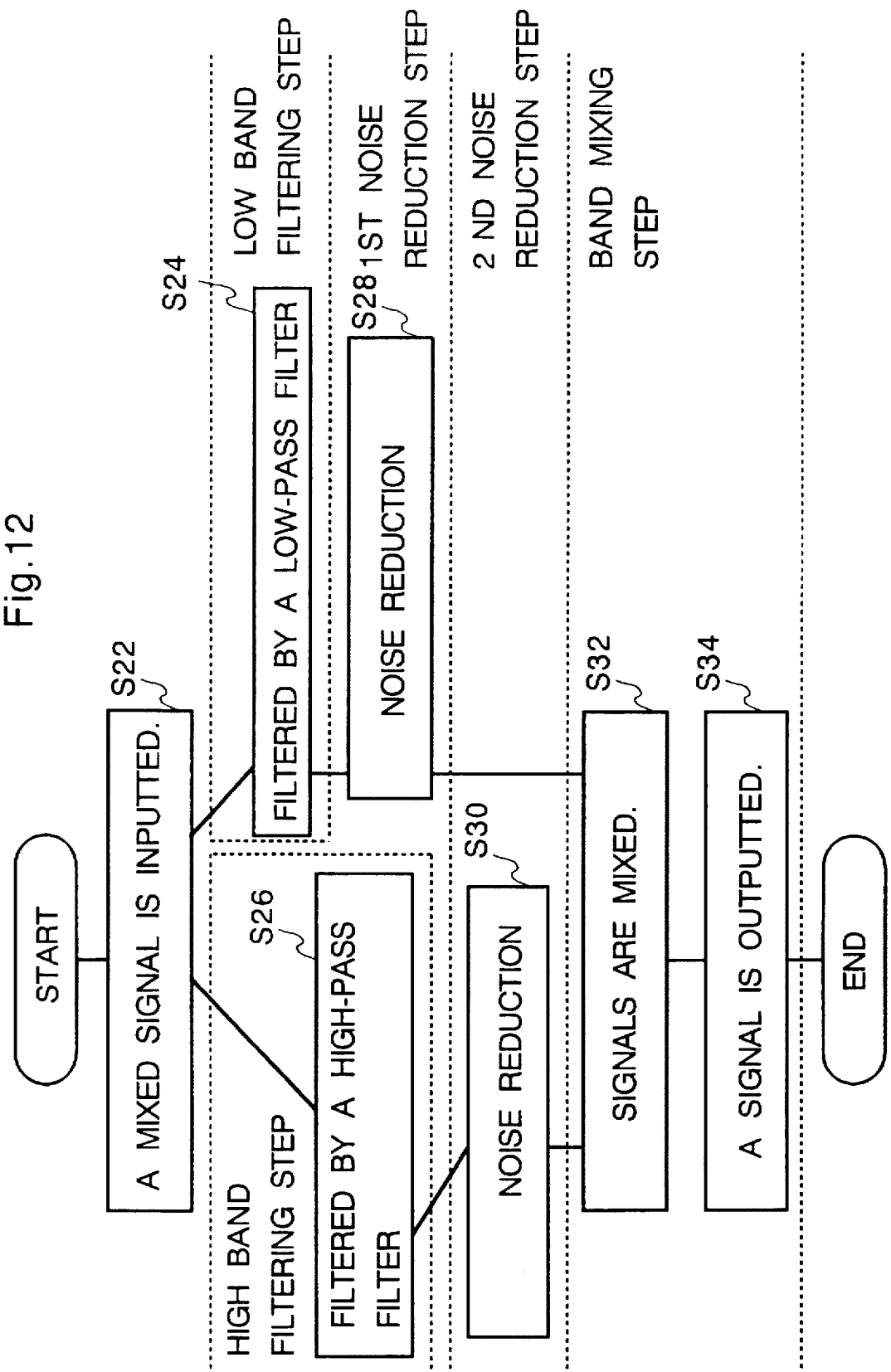
FIG. 12 is a flow chart showing processing steps of the noise reduction apparatus of FIG. 11.

FIG. 12 is a flow chart of the noise reduction method in embodiment 4.

In FIG. 12, a mixed signal is inputted in step S22. In step S24, the inputted mixed signal is filtered by the low-pass filter. In step S28, noise in the signal which has passed through the low-pass filter is reduced. In step S26, the inputted mixed signal is filtered by a high-pass filter. In step S30, noise in the signal which has passed through the high-pass filter is reduced. In step S32, the signal in the high band after noise reduction and the signal in the low band after noise reduction are mixed. In step S34, the mixed signal is outputted.

In this process, step S24 is a low band filtering step. Step S26 is a high band filtering step. Step S28 is a first noise reduction step. Step S30 is a second noise reduction step. Steps S32 and S34 are band mixing steps.

For example, a driving noise from a running automobile generally has HOTH spectrum characteristic (equivalent to noise which is generated by filtering white noise through a low-pass filter of-9 dB/oct), and a low band component of the noise is large. Therefore, the input signal is divided to a low band component and a high band component, and the noise reduction circuit 13 connected to the low-pass filter 12 is set so that a noise in the low band is almost completely canceled and the noise reduction circuit 13 connected to the high-pass filter 11 is set so that half of the noise in the high band is canceled.

In embodiment 4, the noise reduction apparatus in which the high-pass filter 11 and the low-pass filter 12 divide an input signal according to bands, and the noise reduction amount is controlled in a band with a high noise level and in a band with a low noise level respectively.

Embodiment 5

In embodiment 5, an Input signal is divided into a signal which passes through the low-pass filter and a signal which doesn't pass through the low-pass filter, and the noise reduction amounts are controlled respectively.

The noise reduction apparatus in embodiment 5 is used to input a signal after pre-emphasis (high band emphasis)

processing by a pre-emphasis circuit which is not illustrated. Noise in a signal which passes through the low-pass filter and noise in a signal which doesn't pass through the low-pass filter are reduced respectively. Further, a mixing ratio of the signal in a low band and the signal in a high band in the band mixer is controlled, and de-emphasis processing is able to be performed.

Figure 13:
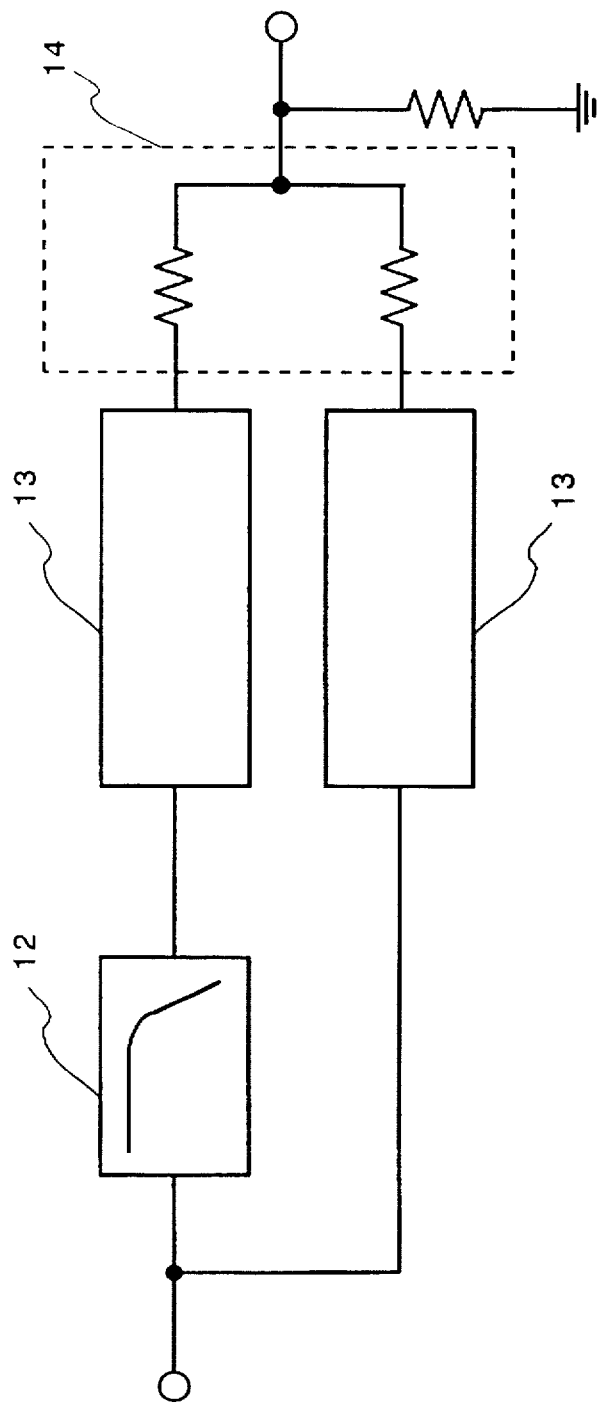
FIG. 13 is a block diagram of a noise reduction apparatus of another embodiment of this invention.

A configuration of the noise reduction apparatus of embodiment 5 is illustrated in FIG. 13.

In FIG. 13, the noise reduction apparatus includes the low-pass filter 12, two noise reeducation circuits 13, and the band mixer 14 which mixes signals in different bands. For the noise reduction circuit 13, one of the noise reduction circuits in embodiments 1–3 is provided.

An input signal is passed through the low-pass filter 12. Then, noise in the signal is reduced in the noise reduction circuit 13, and inputted to the band mixer 14. The entire input signal is also inputted to the noise reduction circuit 13, and the noise is reduced. Then, the signal after noise reduction is inputted to the band mixer 14. The band mixer 14 mixes the signal which has passed through the low-pass filter 12 and the signal which hasn't passed the low-pass filter 12, and outputs the mixed signal. Two noise reduction circuits are able to control noise reduction amounts respectively as in the above-stated embodiments.

Figure 14:
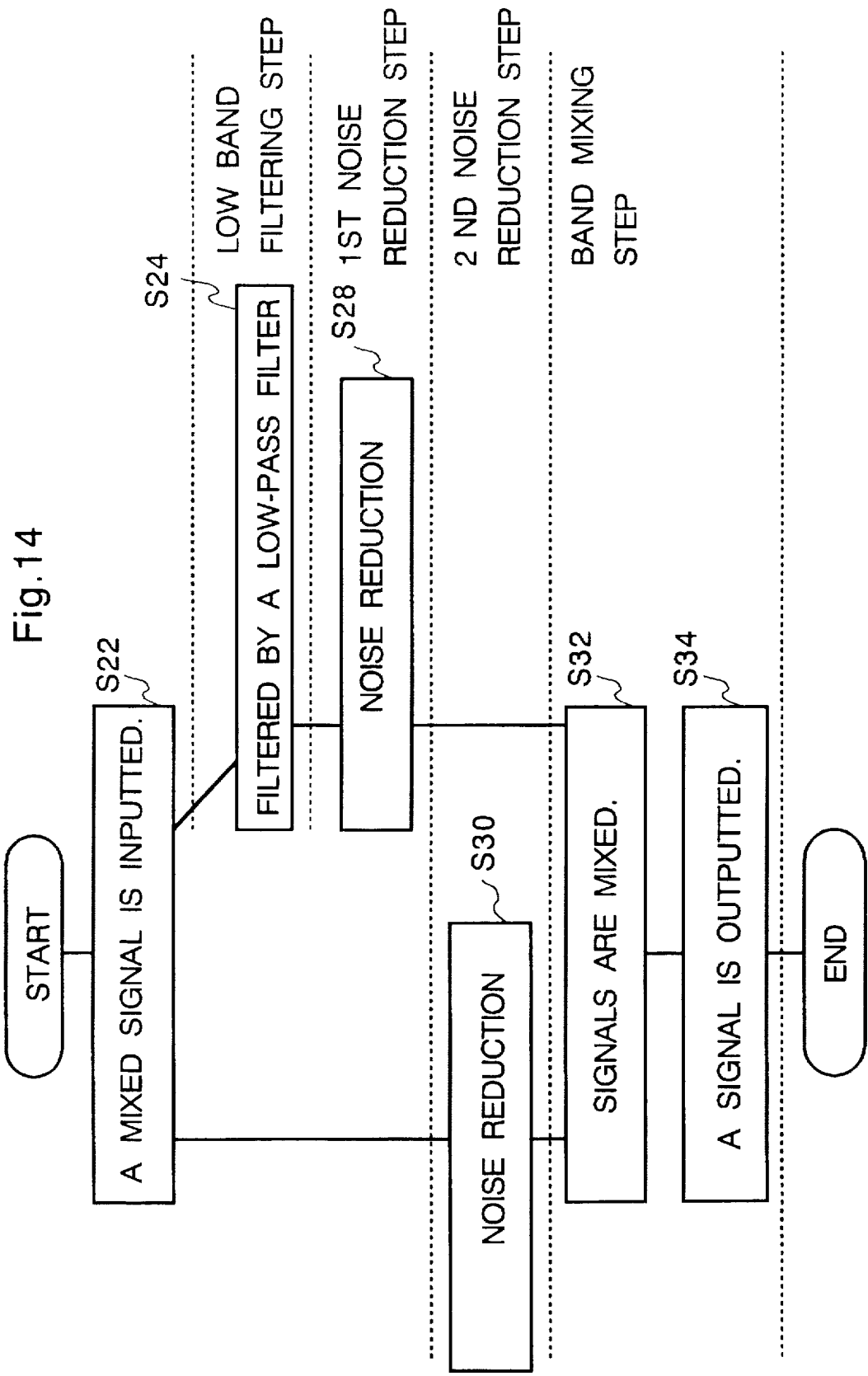
FIG. 14 is a flow chart showing processing steps of the noise reduction apparatus of FIG. 13.

FIG. 14 is a flow chart of the noise reduction method in embodiment 5.

In FIG. 14, a mixed signal is inputted in step S22. In step S24, the signal is filtered by the low-pass filter. In step S28, noise in the signal in a low band which has passed through the low-pass filter is reduced. In step S30, noise in the inputted mixed signal is reduced. In step S32, the input signal after noise reduction and the signal in the low band after noise reduction are mixed. In step S34, the signal is outputted.

In this process, step S24 is a low band filtering step. Step S28 is a first noise reduction step, and step S30 is a second noise reduction step. Steps S32 and S34 are band mixing steps.

For example, a driving noise from a running automobile has a high noise level in a low band (0–500 Hz). Therefore, pre-emphasis processing is performed to emphasize the high band. When a signal after pre-emphasis processing is inputted to the noise reduction apparatus, the signal is filtered by the low-pass filter 12 with a cutoff frequency fc=1 KHz, 6 dB/oct. Thus, the noise in the low band is reduced in the noise reduction circuit 13. Noise in the signal in the low band and the inputted signal are reduced respectively. Further, the low band signal after noise reduction and the signal after noise reduction which hasn't passed through the band-pass filter are processed by de-emphasis processing by controlling a mixing ratio in the band mixer 14. Since the input signal is pre-emphasis processed and a high band of the input signal is emphasized, de-emphasis processing is a process to offset pre-emphasis processing by mixing the signal in the low band after noise reduction and the signal after noise reduction which hasn't passed through the band-pass filter.

Accordingly, the noise in the low band such as driving noise from a running automobile is able to be reduced effectively.

As stated, in embodiment 5, the noise reduction apparatus controls the noise reduction amount of the signal which has passed through the low-pass filter 12 and the signal which hasn't passed through the low-pass filter 12 respectively. Accordingly, the de-emphasis amount is able to be controlled by the band mixer 14.

Embodiment 6.

In embodiment 6, a noise reduction apparatus which is able to reduce a noise in each of a number of bands respectively by dividing an input signal into a number of bands by a plurality of band-pass filters and defining noise reduction amounts for each band with a high noise level and each band with a low noise level.

A configuration of the noise reduction apparatus In embodiment 6 is illustrated in FIG. 15.

In FIG. 15, the noise reduction apparatus includes a plurality of band-pass filters 15, a plurality of noise reduction circuits 13 and a band mixer 14. Each of the noise reduction circuits 13 is connected to each of the plurality of band-pass filters 15 respectively.

A signal after noise reduction is outputted from each of the noise reduction circuits 13. Then, signals which are outputted from each of the noise reduction circuits 13 are mixed in the band mixer 14, and outputted. For the plurality of noise reduction circuits 13, any one of the noise reduction circuits in embodiments 1–3 may be provided.

As stated in other embodiments, the noise reduction amount is able to be controlled by controlling values of two resistances in the mixer 6 in the noise reduction circuit 13.

FIG. 16 is a flow chart of the noise reduction method in embodiment 6.

In FIG. 16, a mixed signal is inputted in step S22. In step S44, the mixed signal is filtered by band-pass filters in each of bands. In step S46, a noise is reduced in each of outputs from each of the band-pass filters. In step S48, the plurality of signals after noise reduction are mixed. In step S34, the signal is outputted.

In this process, step S44 is a band filtering step, step S46 is a noise reduction step and the steps S48 and S34 are band mixing steps.

As stated, in embodiment 6, the noise reduction apparatus reduces noise in each of a number of bands by passing an input signal into many band-pass filters 15 and defining noise reduction amounts in each band with a high noise level and each band with a low noise level.

Embodiment 7.

In embodiment 7, a noise reduction apparatus is able to reduce distortion in an output signal caused by noise reduction processing.

A configuration of the noise reduction apparatus in embodiment 7 is illustrated in FIG. 17.

In FIG. 17, the noise reduction apparatus includes low-pass filter 12, noise reduction circuit 13, a mixer resistance 16, and band mixer 14.

The noise reduction apparatus of FIG. 17 prevents distortion in an output signal in case that noise in a low band signal is reduced.

A signal in a low band is extracted from an input signal by the low-pass filter 12, and noise in the extracted signal is reduced by the noise reduction circuit 13. Then, the signal is inputted to the band mixer 14. At the same time, the signal in the low band signal is branched from the low-pass filter 12 and is inputted to the band mixer 14 via the mixer resistance 16. The input signal is also subjected to noise reduction processing in circuit 13 which is coupled directly to the input terminal, and inputted to the band mixer 14.

In the band mixer 14, the signal in the low band after noise reduction, the signal in the low band before noise reduction and the entire signal which is subjected to noise reduction are mixed and outputted. Since the band mixer 14 adds the signal in the low band after noise reduction and a signal in the low band before noise reduction and a signal after noise reduction, a distortion in output signal is prevented.

FIG. 18 is a flow chart of the noise reduction method of embodiment 6.

In FIG. 18, a mixed signal is inputted in step S22. In step S24, the mixed signal is filtered by the low-pass filter. In step S28, noise in the signal in the low band is reduced. In step S26, the inputted mixed signal is filtered by the high-pass filter. In step S30, noise in the signal in the high band is reduced. In step S32, the signal in the high band after noise reduction, the signal in the low band after noise reduction and the signal in the low band before noise reduction are mixed. In step S34, the mixed signal is outputted.

In this process, step S24 ia a low band filtering step, and step S26 is a high band filtering step. Step S28 is a first noise reduction step, step S30 is a second noise reduction step, and steps S32 and S34 are band mixing steps.

FIG. 17 shows the case that noise in a signal in a low band is reduced and distortion in an output signal is prevented. Similarly, in the case that a high-pass filter is provided instead of the low-pass filter, noise in a signal in a high band which has passed through the high-pass filter is reduced and a distorted signal is outputted. It is also possible to reduce distortion in the signal when the signal in the high band is passed through the mixer resistance 16, and mixed with other signals in the band mixer 14.

As shown in FIG. 15, when the input signal is divided according to bands and noise in a signal which is passed through the band-pass filter 15 in a certain band is reduced and an output signal is distorted, the signal which is passed through the band-pass filter is passed through the mixer resistance 16, and mixed with other signals in the band mixer 14 in order to reduce the distortion.

When the input signal is not divided according to bands, the input signal of which noise is not reduced in the noise reduction circuit 13 is passed through the mixer resistance 16, and mixed in the band mixer 14 in order to reduce the distortion.

When a mixing amount of the signal before noise reduction is large, an effect of the noise reduction becomes less. Therefore, the mixing resistance 16 is set at 270 KΩ, and the resistance in the band mixer 14 is set at 10 KΩ.

As stated, in embodiment 8, when an output signal is distorted due to noise reduction processing in the noise reduction circuit, the signal before noise reduction is mixed with the signal after noise reduction in order to reduce the distortion.
Embodiment 8.

In embodiment 8, a limiter to prevent an over-input is added to the noise reduction circuit of embodiment 7.

The noise reduction circuit of embodiment 8 is illustrated in FIG. 19.

In FIG. 19, a limiter 17 is added to the noise reduction circuit of FIG. 5 or FIG. 10 as an over-input distortion prevention circuit. For the AC/DC converter in FIG. 19, either the AC/DC converter 7 in FIG. 5 or the half-wave AC/DC converter 10 in FIG. 10 may be provided. Other elements are the same as embodiment 7.

A signal is inputted to the limiter 17. A signal which is outputted form the limiter 17 is inputted to the filter 9 and the mixer 6. The limiter 17 includes a resistance 171 of 2.7 KΩ, a resistance 172 of 680 KΩ, a transistor 173 and resistances 174 and 175. A base of the transistor 173 is connected the AC/DC converter 7 or 10 via the resistance 174.

For example, when the input signal is 1.5 Vrms or more, a base voltage of the transistor 173 reaches 0.6 V by the AC/DC converter 7 or 10, and the transistor is turned on. Therefore, the input signal is attenuated so that the output signal from the limiter 17 doesn't exceed 1.5 Vrms.

As stated, in embodiment 8, the limiter is provided to prevent over-inputting of the input signal.

The noise reduction circuit which includes the limiter to prevent an over-input may be used as the noise reduction circuit in the noise reduction apparatus in embodiments 4–7.
Embodiment 9.

The noise reduction circuit and the noise reduction apparatus in embodiment 8 may be provided as a sound input apparatus or an acoustic input apparatus such as a portable telephone, telephone, microphone, etc.

An external view of a communication apparatus which includes the noise reduction circuit and the noise reduction apparatus in embodiment 8 is illustrated in FIGS. 20A and 20B.

Since the noise reduction circuit and the noise reduction apparatus are provided in the communication apparatus, noise between voice signals is canceled.

According to the conventional related art, the noise reduction circuit did not operate while speaking with the microphone. Therefore, an unpleasant background noise remained. However, such an unpleasant noise is canceled by the circuit and method of this invention.

Furthermore, according to the related art, the control voltage controller was provided to control an attenuation level of the input signal by a variable attenuator. As stated in related art 1, a time constant is necessary to raise a control voltage in the control voltage controller from 0 V to 4.5 V. In this case, tens of msec are necessary. Hence, a beginning part of a voice signal is missed.

In embodiments 2 and 3, the transistor 8 is turned ON/OFF to attenuate the input signal, if the base voltage is 0.6 V or more or not. At the same time, the filter 9 is turned ON/OFF at once. According to a transistor in related art 1, a clicking sound is generated at a time of ON/OFF. Therefore, the transistor is not able to be used.

However, according the noise reduction circuit in this invention, the input signal and an inverted phase signal are added in the mixer 6. Therefore, a clicking sound is not generated.

Further, in related art 1, the beginning part of the voice signal was missed due to a delay in operation of the noise reduction circuit which attenuates the input signal. However, according to this invention, the beginning part of the signal is not missed.

In the noise reduction circuit of this invention, an inexpensive transistor may be used instead of the electronic volume IC which is expensive.

Furthermore, in embodiment 1, the transistor 8 and the filter 9 are not provided in the noise reduction circuit. Therefore, a beginning part of a voice signal is not missed.

According to the noise reduction circuit of this invention, when a signal with noise is inputted, the noise is canceled, and other signals besides noise are outputted in their entirety by generating an inverted amplified signal which is restricted in an amplitude.

According to the noise reduction circuit of this invention, when a signal with a noise is inputted, an inverted amplified signal which maintains a constant amplitude of the noise and the signal besides the noise is generated. Therefore, the noise is able to be canceled and the signal other than the noise is outputted in its entirety without distinguishing the noise from the signal besides the noise. Further, a high quality signal is able to be outputted.

According to the noise reduction circuit of this invention, above effects are able to be achieved in a circuit with a simple configuration.

According to the noise reduction circuit of this invention, an over-input is able to be prevented.

According to the noise reduction circuit of this invention, a noise reduction amount is set for each of a signal which passes through a low-pass filter and a signal which doesn't pass through the low-pass filter respectively. When a signal after pre-emphasis processing is inputted, noise reduction processing is able to be performed for each of the signal which passes through the low-pass filter and the signal which doesn't pass through the low-pass filter respectively. Further, de-emphasis processing is able to be performed by controlling a mixing amount in a band mixer.

According to the noise reduction apparatus of this invention, a noise reduction amount is set in each of a number of bands with a high noise level and a band with a low noise level respectively. Therefore, noise reduction processing is able to be performed for each of the bands respectively.

According to the noise reduction apparatus of this invention, a noise reduction amount is in each of a number of bands respectively. Therefore, noise reduction processing is able to be performed in each of the bands respectively.

According to the noise reduction apparatus of this invention, distortion in an output signal is able to be reduced.

According to a noise reduction method of this invention, when a signal with a noise is inputted, the noise is canceled, and the signal other than the noise is outputted thoroughly.

According to the noise reduction method of this invention, when a signal containing noise is inputted, the noise is canceled and the signal without the noise is entirely outputted by generating an inverted amplified signal which maintains a constant amplitude of the noise and the input signal.

According to the noise reduction method of this invention, a noise reduction amount is set for each of a signal which passes through the low-pass filter and a signal which doesn't pass through the low-pass filter respectively. When a signal after pre-emphasis processing is inputted, noise reduction processing is able to be performed for each of the signal which passes through the low-pass filter and the signal which doesn't pass through the low-pass filter respectively. Further, de-emphasis processing is able to be performed by controlling a mixing amount in a band mixer.

According to the noise reduction method of this invention, a noise reduction amount is set in each of a band with a high noise level and a band with a low noise level respectively, and noise reduction processing is able to be performed respectively in each of the bands.

According to the noise reduction method of this invention, the noise reduction amount is set in each of bands respectively, and noise reduction processing is able to be performed respectively in each of the bands.

According to the noise reduction method of this invention, a distortion in an output signal is able to be reduced.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A noise reduction circuit comprising:
   (a) an inverting amplifier for receiving an input signal containing noise, and for outputting an inverted amplified signal which is restricted in amplitude;
   (b) an attenuator for attenuating the inverted amplified signal outputted from the inverting amplifier to develop an attenuated signal; and
   (c) a mixer for adding the input signal and the attenuated signal to develop an output signal at an output terminal, wherein the output signal corresponds to the input signal but with a reduction in the amount of noise contained in the input signal.

2. A noise reduction circuit comprising:
   (a) an inverting amplifier for receiving an input signal containing noise, and for outputting an inverted amplified signal which is restricted in amplitude;
   (b) an attenuator for attenuating the inverted amplified signal outputted from the inverting amplifier to develop an attenuated signal;
   (c) a mixer for adding the input signal and the attenuated signal to develop an output signal at an output terminal; and
   (d) an level control circuit connected between an output and an input of said inverting amplifier which maintains a constant amplitude of the output signal from the inverting amplifier.

3. The noise reduction circuit of claim 2, wherein the auto level controller contains an AC/DC converter with a half-wave amplifier.

4. The noise reduction circuit of claim 2, further comprising an over-input distortion prevention circuit which attenuates said input signal and prevents distortion due to an over-input.

5. A noise reduction method comprising:
   (a) an inverting amplifying step, wherein an input signal is inputted, inverted and amplified, and an inverted amplified signal with a restricted amplitude is generated;
   (b) an attenuation step, wherein the signal which is inverted and amplified in the inverting amplifying step is attenuated;
   (c) a signal adding step, wherein the input signal and a signal which is attenuated in the attenuation step are added, and outputted; and
   (d) an auto level control step to maintain a constant amplitude of the inverted amplified signal which is outputted in the inverting amplifying step.

* * * * *

UNITED STATES PATENT AND TRADEMARK OFFICE
CERTIFICATE OF CORRECTION

PATENT NO. : 5,796,850
DATED : August 18, 1998
INVENTOR(S) : Takashi Shiono, et. al.

It is certified that error appears in the above-identified patent and that said Letters Patent is hereby corrected as shown below:

Col. 8, line 55, "Ls" should be -- is --; and <u>In the Claims:</u> Col. 20, line 30 (claim 2), "(d) an level" should be -- (d) an output level --.

Signed and Sealed this

Thirtieth Day of May, 2000

Attest:

Q. TODD DICKINSON

*Attesting Officer*  *Director of Patents and Trademarks*